United States Patent
Yamazaki

(10) Patent No.: US 9,021,481 B2
(45) Date of Patent: Apr. 28, 2015

(54) COMPUTER-READABLE RECORDING MEDIUM, MIGRATION CONTROL METHOD AND CONTROL DEVICE

(71) Applicant: Fujitsu Limited, Kawasaki-shi (JP)

(72) Inventor: Takehiro Yamazaki, Inagi (JP)

(73) Assignee: Fujitsu Limited, Kawasaki (JP)

( * ) Notice: Subject to any disclaimer, the term of this patent is extended or adjusted under 35 U.S.C. 154(b) by 256 days.

(21) Appl. No.: 13/723,277

(22) Filed: Dec. 21, 2012

(65) Prior Publication Data

US 2013/0263128 A1 Oct. 3, 2013

(30) Foreign Application Priority Data

Mar. 27, 2012 (JP) ................................ 2012-071876

(51) Int. Cl.
G06F 9/455 (2006.01)
G06F 9/445 (2006.01)

(52) U.S. Cl.
CPC ........ *G06F 9/455* (2013.01); *G06F 8/63* (2013.01); *G06F 9/45558* (2013.01); *G06F 2009/4557* (2013.01)

(58) Field of Classification Search
None
See application file for complete search history.

(56) References Cited

U.S. PATENT DOCUMENTS

| 7,925,923 | B1* | 4/2011 | Hyser et al. ................ 714/13 |
|---|---|---|---|
| 8,095,929 | B1* | 1/2012 | Ji et al. .................... 718/1 |
| 8,185,894 | B1* | 5/2012 | Watson et al. ............... 718/1 |
| 8,826,292 | B2* | 9/2014 | Heim ....................... 718/105 |
| 2006/0230407 | A1* | 10/2006 | Rosu et al. ................ 718/105 |
| 2007/0130566 | A1* | 6/2007 | van Rietschote et al. ...... 718/1 |
| 2008/0028402 | A1 | 1/2008 | Senoo |
| 2008/0282348 | A1* | 11/2008 | Proudler et al. ............ 726/22 |
| 2009/0288083 | A1* | 11/2009 | Ciano et al. ................ 718/1 |
| 2010/0106885 | A1* | 4/2010 | Gao et al. .................. 711/6 |
| 2010/0268812 | A1* | 10/2010 | Mohrmann et al. ........ 709/224 |
| 2011/0131569 | A1* | 6/2011 | Heim ........................ 718/1 |
| 2011/0191559 | A1* | 8/2011 | Li et al. .................. 711/162 |
| 2012/0180042 | A1* | 7/2012 | Tsirkin et al. ............... 718/1 |
| 2013/0047153 | A1* | 2/2013 | Emaru ...................... 718/1 |
| 2013/0081016 | A1* | 3/2013 | Saito et al. ................. 718/1 |
| 2013/0091376 | A1* | 4/2013 | Raspudic et al. ............ 714/3 |
| 2013/0097603 | A1* | 4/2013 | Amano et al. .............. 718/1 |
| 2013/0174117 | A1* | 7/2013 | Watters et al. ............ 717/106 |
| 2013/0339957 | A1* | 12/2013 | Azam et al. ................ 718/1 |

FOREIGN PATENT DOCUMENTS

| JP | 2005-332223 | 12/2005 |
|---|---|---|
| JP | 2007-183747 | 7/2007 |
| JP | 2007-299425 | 11/2007 |
| JP | 2008-033483 | 2/2008 |
| JP | 2010-532527 | 10/2010 |
| WO | WO-2009/005996 | 1/2009 |

\* cited by examiner

*Primary Examiner* — Adam Lee
(74) *Attorney, Agent, or Firm* — Fujitsu Patent Center

(57) ABSTRACT

A control device includes a moving unit that moves a storage image of a machine that is currently used as a virtual machine environment, to a predetermined storage area, and a writing unit that, after a completion of a move by the moving unit, writes a new storage image including an operating system in a physical machine environment, to the machine in which the move is completed.

9 Claims, 20 Drawing Sheets

FIG.2

| ⌠12a | ⌠12b | ⌠12c | ⌠12d | ⌠12e | ⌠12f | ⌠12g | ⌠12h | ⌠12i | ⌠12j |
|---|---|---|---|---|---|---|---|---|---|
| ARRANGE-MENT NAME | RM HOST NAME | IP ADDRESS | OPER-ATION STATE | IN-USE FLAG (IN-USE SERVICE NAME) | CORRE-SPONDENCE SYSTEM (VERSION) | INSTALLED OS (VERSION, VM ALLOCATION CORE COUNT) | DEPLOY-MENT AUTHOR-ITY | IMAGE FILE NAME | RE-MARK |
| vnode001 | node218 | xx.xx.xx.xx | OPER-ATION | 1 (AAA) | PRIMERGY RX300S3 | RHEL 4.6 WS | admin | rx300s3_rhel46ws.fc2 | |
| vnode005 | VNW1 | yy.yy.yy.yy | OPER-ATION | 0 | VMWare ESXi (4.1) | RHEL (4.7, 1) | admin | nishi_linux.vmdk | |
| | | | | | | Windows XP Professional (SP3, 1) | | win_xp.vmdk | |
| | | | | | | Windows Server 2003 (2003, 2) | | win2003_04.vmdk | |
| ... | ... | ... | ... | ... | ... | ... | ... | ... | ... |

| ARRANGE-MENT NAME | VM MOVE ENABLE/DISABLE FLAG | | | | MAXIMUM DEFINITION VALUE OF VM AVERAGE CPU UTILIZATION [%] |
|---|---|---|---|---|---|
| | 1 | 2 | ... | N | |
| vnode005 | ENABLE | ENABLE | ... | | 20 |
| ⋮ | ⋮ | ⋮ | ... | ⋮ | ⋮ |

FIG.16

| VM IMAGE FILE NAME (65a) | VM BINARY IMAGE (65b) | VM PLATFORM (65c) | VM PLATFORM VERSION (65d) | INSTALLED OS (65e) | RE-MARK (65f) |
|---|---|---|---|---|---|
| nishi.linux.vmdk | ... | VMWare ESXi | 4.0 TO 4.1 | RHEL 4.7 (1) | |
| ... | ... | ... | ... | ... | ... |

| ARRANGE-MENT NAME (g1) | RM HOST NAME (g2) | OPERATION STATE (g3) | CORRE-SPONDENCE SYSTEM (g4) | INSTALLED OS/ VERSION (VM ALLOCATION CORE COUNT) (g5) | IMAGE FILE NAME (g6) |
|---|---|---|---|---|---|
| vnode001 | node218 | OPERATION | PRIMERGY RX300S3 | RHEL 4.6 WS | rx300s3. rhel46ws.fc2 (600MB) |
| vnode002 | hpc-g588 | DURING DEPLOY-MENT (50%) | PRIMERGY RX300S3 | CentOS 4.4 | rx300s3. cent44.fc2 (600MB) |
| vnode003 | wnode451 | DURING IMAGE EXTRAC-TION (0%) | PRIMERGY RX300S3 | Windows XP Professional SP3 | rx300s3. winxpprosp3. fc2(500MB) |
| vnode004 | — | STOP | PRIMERGY RX300S3 | — | — |
| vnode005 | vmw1 | OPERATION | VMWare ESXi (4.1) | RHEL 4.7 (1) | nishi.linux. vmdk(50MB) |
| | | | | Windows XP Professional SP3 (1) | win_xp.vmdk (60MB) |
| | | | | Windows Server 2003 (2) | win2003_04. vmdk(50MB) |
| vnode006 | hyv6 | OPERATION | Hyper-V 2.0 | Windows Server 2008 R2 (2) | hyper_win2008_ 02.vhd(70MB) |
| vnode007 | kvm4 | DURING DEPLOY-MENT (10%) | KVM 2.2 | RHEL 5.0 (1) | kvm_rhel50_1. img(50MB) |

_US 9,021,481 B2_

COMPUTER-READABLE RECORDING MEDIUM, MIGRATION CONTROL METHOD AND CONTROL DEVICE

CROSS-REFERENCE TO RELATED APPLICATION

This application is based upon and claims the benefit of priority of the prior Japanese Patent Application No. 2012-071876, filed on Mar. 27, 2012, the entire contents of which are incorporated herein by reference.

FIELD

The embodiments discussed herein are directed to a migration control method and so on.

BACKGROUND

In recent years, a virtual machine environment is used in a computer system.

Examples of the virtual machine environment include the one using a hypervisor scheme. In the hypervisor scheme, there is a well-known technique of operating a hypervisor to realize virtualization on physical machine hardware and operating a plurality of VM's (Virtual Machines) on this hypervisor. If these virtual machines are moved to a hypervisor of a different physical machine, they can continue processing. Subsequently, resources such as a CPU and memory are efficiently allocated to these virtual machines by the hypervisor.

Also, in a computer system, a physical machine environment is used. In the physical machine environment, batch processing to collectively process data can make the best use of resources such as a CPU and memory via an OS (Operating System).

Patent Document 1: Japanese Laid-open Patent Publication No. 2007-299425

Patent Document 2: Japanese Laid-open Patent Publication No. 2007-183747

Patent Document 3: Japanese National Publication of International Patent Application No. 2010-532527

However, in a virtual machine environment, there is a problem that it is difficult to perform batch processing at high speed. That is, in the virtual machine environment, in a case of allocating resources to a plurality of virtual machines, a hypervisor uses the resources such as a CPU and memory. Therefore, in a case where the virtual machine tries to perform batch processing, it is difficult to make the best use of resources such as a CPU and memory and perform the batch processing at high speed.

SUMMARY

According to an aspect of an embodiment, a computer-readable recording medium has stored therein a migration control program that causes a computer to perform a process including moving a storage image of a machine that is currently used as a virtual machine environment, to a predetermined storage area, and, after a completion of a move at the moving, writing a new storage image including an operating system in a physical machine environment, to the machine in which the move is completed.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a view illustrating an example of a data structure of an RM management table according to the first embodiment;

FIG. 15 is a view illustrating an example of a data structure of a VM state management table according to the second embodiment;

FIG. 16 is a view illustrating an example of a data structure of a VM image file according to the second embodiment;

FIG. 18 is a view illustrating an output example of an RM state;

DESCRIPTION OF EMBODIMENTS

Preferred embodiments of the present invention will be explained with reference to accompanying drawings. Incidentally, the present invention is not limited to these embodiments. Further, it is possible to adequately combine the embodiments within a range in which processing content is not contradictory.

[a] First Embodiment

Configuration of Migration Control System According to First Embodiment

Figure 1:
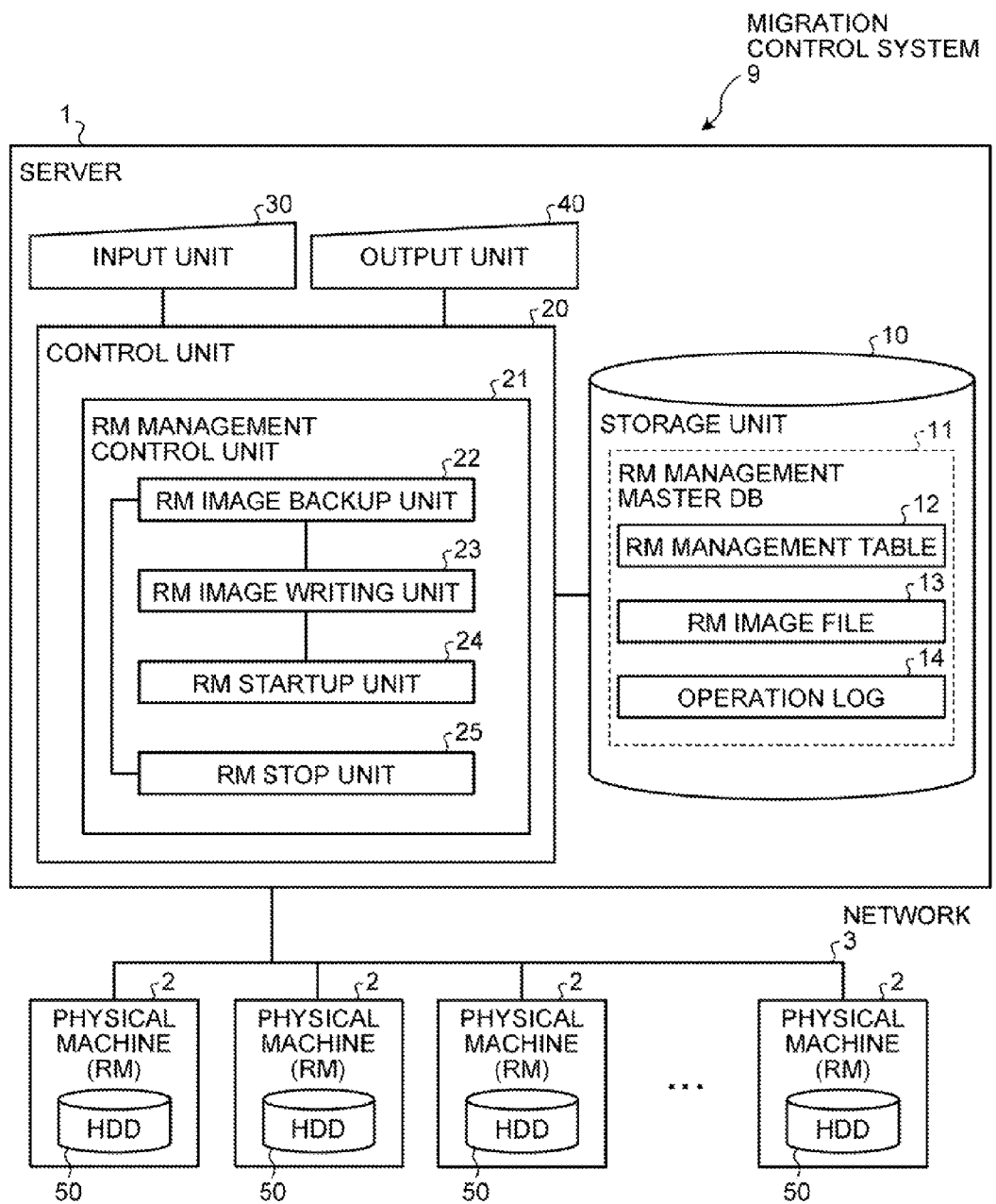
FIG. 1 is a functional block diagram illustrating a configuration of a migration control system according to a first embodiment.

FIG. 1 is a functional block diagram illustrating a configuration of a migration control system according to a first embodiment. As illustrated in FIG. 1, a migration control system 9 includes a server 1 and a plurality of physical machines 2 that are connected by a network 3. The plurality of physical machines 2 include a physical-machine-environment machine and a virtual-machine-environment machine. In the physical-machine-environment machine, an OS is installed on hardware. In the virtual-machine-environment machine, in a case where a hypervisor scheme to realize virtualization is used, a hypervisor is installed on hardware. Subsequently, the virtual-machine-environment machine operates a plurality of virtual machines (VM's) on the hypervisor. In the embodiment, this hypervisor is also referred to as "VM platform (VMP)." Also, although the hypervisor scheme is adopted as a scheme to realize virtualization, it is not limited thereto.

The physical machine 2 includes a hard disk (HDD) 50. The physical machine 2 is deployed as "RM (Removable Machine)." This "RM" denotes a machine that can shift a machine environment. That is, the RM denotes a machine that can shift a machine environment from the virtual machine environment to the physical machine environment, or shift the machine environment from the physical machine environment to the virtual machine environment. That is, even in a physical machine of a physical machine environment in which the machine environment is fixed in the related art, the RM represents a machine that can save, restore, shift or copy the machine environment.

Although a LAN (Local Area Network) is a representative example of the network 3, it may be the Internet, an intranet or extranet using the Internet or a carrier network. The embodiment will be explained where the network 3 is the LAN.

The server 1 backs up a storage image of a physical machine that is currently used as a virtual machine environment, in a predetermined storage area. Subsequently, after completing the backup, the server 1 writes a new storage image including an OS, in the physical machine for which the backup is completed, such that it is used as a physical machine environment. In other words, the server 1 is deployed with the physical machine 2 as an RM. Subsequently, the server 1 switches the virtual-machine-environment machine to a physical-machine-environment machine.

The server 1 includes a storage unit 10, a control unit 20, an input unit 30 and an output unit 40. The input unit 30 inputs an RM switching instruction or the like, and corresponds to a keyboard, a mouse, a microphone and so on. The output unit 40 outputs the state of each RM or the like, and corresponds to a display (or a monitor or a touch panel).

The storage unit 10 corresponds to a storage device such as a nonvolatile semiconductor memory chip including, for example, a flash memory and FRAM (Ferroelectric Random Access Memory) (registered trademark). Subsequently, the storage unit 10 stores an RM management table 12, an RM image file 13 and an operation log 14 as an RM management master DB (DataBase) 11.

The RM management table 12 manages each physical machine 2 as an RM. The RM image file 13 represents file information of each "RM image" and is used when the RM image is backed up. The "RM image" means a storage image of a physical machine deployed as an RM. The storage means content of the HDD 50 and includes an OS of the physical machine environment and VMP and VM images of the virtual machine environment. The operation log 14 represents a log output when RM management control (described later) is operated, and the log content varies depending on various generated events. Also, an explanation of the RM management table 12 and the RM image file 13 will be given later in detail.

The control unit 20 includes an internal memory to store programs or control data to define various processing steps, and, by this means, perform various kinds of processing.

Subsequently, the control unit 20 corresponds to an integrated circuit such as an ASIC (Application Specific Integrated Circuit) and FPGA (Field Programmable Gate Array), or an electronic circuit such as a CPU (Central Processing Unit) and an MPU (Micro Processing Unit). Further, the control unit 20 includes an RM image backup unit 22, an RM image writing unit 23, an RM startup unit 24 and an RM stop unit 25 as an RM management control unit 21.

The RM image backup unit 22 backs up an RM image of a switching target RM into the RM management master DB 11. Here, the RM image backup unit 22 stops (i.e. turns off a power supply) the switching target RM once and subsequently turns on the power supply of the RM. Stopping the RM is performed by the RM stop unit 25 (described later). To turn on the power supply of the RM is realized by using, for example, a WOL (Wake On LAN).

For example, the RM image backup unit 22 acquires an RM switching instruction including an arrangement name of the switching target RM from a web browser. Subsequently, based on the RM management master DB 11, the RM image backup unit 22 acquires the image file name of an RM image corresponding to the arrangement name of the switching target RM. Subsequently, the RM image backup unit 22 extracts the RM image of the acquired image file name from the switching target RM and backs up the extracted RM image into the RM image file 13 in the RM management master DB 11. As an example, in a case where a machine environment of a switching target RM is the virtual machine environment, the RM image backup unit 22 backs up VMP and RM images of VM in the virtual machine environment. Also, the RM image backup unit 22 will be described later in detail.

Here, data structures of the RM management table 12 and the RM image file 13 will be explained with reference to FIGS. 2 and 3. FIG. 2 is a view illustrating an example of a data structure of an RM management table according to the embodiments. As illustrated in FIG. 2, the RM management table 12 stores an arrangement name 12a, an RM host name 12b, an IP address 12c, an operation state 12d and an in-use flag 12e in association with one another. Further, the RM management table 12 stores a correspondence system 12f, an installed OS 12g, a deployment authority 12h, an image file name 12i and a remark 12j in association with one another.

The arrangement name 12a represents a name to identify a physical machine itself deployed as an RM. The RM host name 12b represents the host name of an RM after the RM is deployed. Although the RM host name 12b represents a host name stored in an RM image file at the time of deployment, it may be changed to another host name. The IP address 12c represents an IP address of an RM after the RM is deployed. Although the IP address 12c represents an IP address stored in an RM image file at the time of deployment, it may be changed to another IP address. The operation state 12d represents a state of an RM corresponding to the arrangement name 12a. For example, the operation state 12d sets each of states of "operation" indicating an operation state, "stop" indicating a stop state, and "during image extraction", "during deployment," "during startup" and "during stop" indicating a ready state.

The in-use flag 12e represents a flag to manage whether it is in use by the user. For example, "1" is set in a case where it is in use by the user, and "0" is set in a case where it is not in use by the user. Here, in the case where it is in use by the user, the name of the currently used service is set. The correspondence system 12f designates a type of a physical machine itself deployed as an RM in a case of a physical machine environment in which a VMP is not deployed, and designates a VMP identifier, that is, the VMP name and the VMP version in a case of a virtual machine environment in which the VMP is deployed. The installed OS 12g represents the name of a deployed OS and a version of the OS. Here, in a case where a VMP is deployed, the number of cores assigned to the OS or the assignment memory amount is additionally set. The deployment authority 12h sets an identifier of a user who has authority to control a physical machine deployed as an RM. The image file name 12i represents the name of a deployed RM image file. A note is set in the remark 12j.

Figure 3:
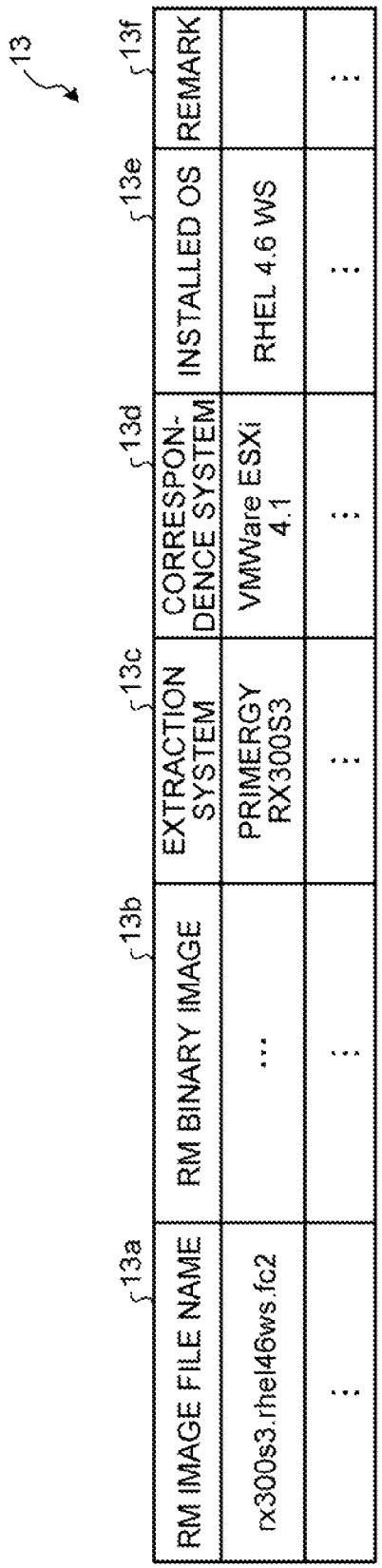
FIG. 3 is a view illustrating an example of a data structure of an RM image file according to the first embodiment.

FIG. 3 is a view illustrating an example of a data structure of an RM image file according to the first embodiment. As illustrated in FIG. 3, the RM image file 13 stores an RM image file name 13a, an RM binary image 13b, an extraction system 13c, a correspondence system 13d, an installed OS 13e and a remark 13f. The RM image file name 13a represents a file name to identify an RM image. The RM binary image 13b represents binary data of an RM image. That is, the RM binary image 13b represents data extracted from the HDD 50 of the physical machine 2 deployed as an RM. The extraction system 13c represents a correspondence system of the physical machine 2 from which an RM image is extracted, and corresponds to the correspondence system 12f of the RM management table 12. The correspondence system 13d represents a correspondence system in which an RM image indicated by the RM image file name 13a can be arranged and which is different from the correspondence system indicated by the extraction system 13c. The installed OS 13e represents the name and version of an OS of an RM image. A note is set in the remark 13f.

Returning to FIG. 1, the RM image writing unit 23 writes a new RM image in a switching target RM. For example, the RM image writing unit 23 acquires a new RM image designated by the web browser, from the RM image file 13 of the RM management master DB 11, and writes the acquired RM image in the switching target RM. As an example, the RM image writing unit 23 writes an RM image of an OS of a physical machine environment in the switching target RM so as to deploy an RM and provide a physical-machine-environment machine. After writing the entire RM image in the switching target RM, the RM image writing unit 23 turns off the power supply of the physical machine in which the RM is deployed. Also, the RM image writing unit 23 will be described later in detail.

The RM startup unit 24 starts up an RM for the physical machine 2 in which a new RM image is written by the RM image writing unit 23. This is because, for example, in a case where a newly written RM image is an OS, the new OS is to be booted. Also, the RM startup unit 24 will be described later in detail.

The RM stop unit 25 stops a corresponding RM. For example, the RM stop unit 25 is used when an RM is stopped in the RM image backup unit 22. Also, the RM stop unit 25 will be described later in detail.

Steps of RM Management Control Processing

Figure 4:
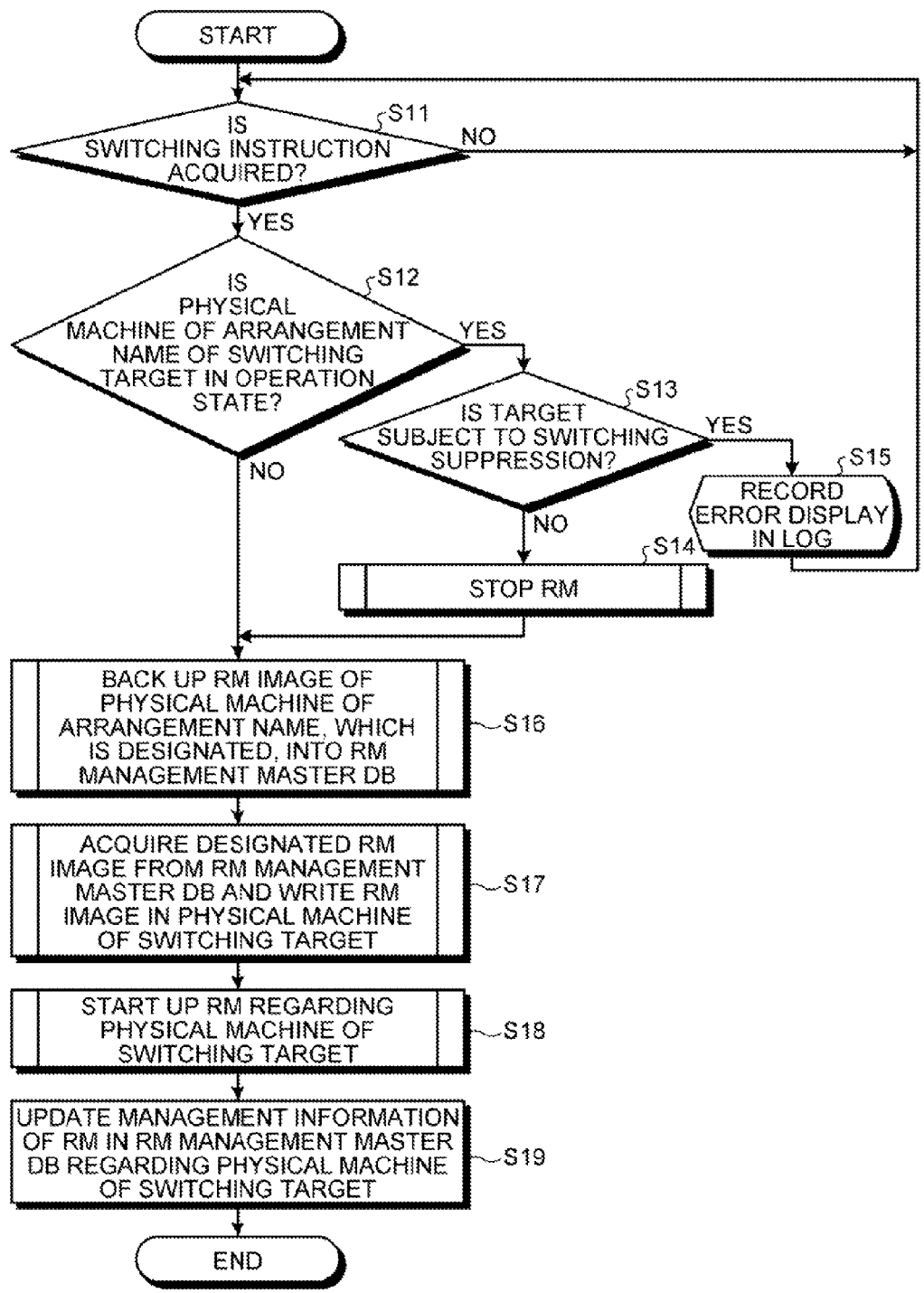
FIG. 4 is a flowchart illustrating RM management control processing according to the first embodiment.

Next, RM management control processing performed by the RM management control unit 21 will be explained. FIG. 4 is a flowchart illustrating RM management control processing according to the first embodiment. Also, an explanation will be given with assuming that an RM switching instruction is output from a web browser. Also, it is assumed that the physical machine 2 deployed as an RM is set in advance such that the server 1 can remotely turn on or turn off a power supply or perform a network boot. Here, it is assumed that, in the physical machine 2, a PXE (Preboot eXecution Environment) or WOL is set in a BIOS (Basic Input/Output System).

First, the RM image backup unit 22 decides whether an RM switching instruction is acquired (step S11). When it is decided that the switching instruction is not acquired (No in step S11), the RM image backup unit 22 repeats decision processing until the switching instruction is acquired. Meanwhile, when it is decided that the switching instruction is acquired (Yes in step S11), the RM image backup unit 22 proceeds to step S12. Also, the switching instruction includes the arrangement name of the physical machine 2 (RM) of a switching target and the file name of an RM image that is newly written in the RM.

Subsequently, the RM image backup unit 22 decides whether the physical machine 2 of the arrangement name of the switching target is in an operation state (step S12). The decision as to whether the physical machine 2 of the arrangement name of the switching target is in an operation state is made by referring to the operation state 12d of the RM management table 12. For example, when the operation state 12d indicates "operation" or a ready state, the RM image backup unit 22 decides that it is in the operation state, and, when the operation state 12d indicates "stop," the RM image backup unit 22 decides that it is not in the operation state.

Subsequently, when it is decided that the physical machine 2 of the arrangement name of the switching target is not in the operation state (No in step S12), the RM image backup unit 22 proceeds to step S16. Meanwhile, when it is decided that the physical machine 2 of the arrangement name of the switching target is in the operation state (Yes in step S12), the RM image backup unit 22 decides whether the physical machine 2 of the arrangement name of the switching target is a switching suppression target (step S13). The decision as to whether the physical machine 2 of the arrangement name of the switching target is a switching suppression target is made by, for example, referring to the in-use flag 12e of the RM management table 12. As an example, when the in-use flag 12e is "1" indicating that it is in use by the user, the RM image backup unit 22 decides that it is a switching suppression target, and, when the in-use flag 12e is "0" indicating that it is not in use by the user, the RM image backup unit 22 decides that it is not the switching suppression target.

Subsequently, when it is decided that the physical machine 2 of the arrangement name of the switching target is not a switching suppression target (No in step S13), the RM image backup unit 22 stops the physical machine 2 (RM) of an operation state (step S14). Subsequently, the RM image backup unit 22 proceeds to step S16. Meanwhile, when it is decided that the physical machine 2 of the arrangement name of the switching target is a switching suppression target (Yes in step S13), the RM image backup unit 22 displays an error on the output unit 40 and records it in the operation log (step S15). Subsequently, the RM image backup unit 22 proceeds to step S11. The operation log 14 records, for example, an authorized user name, an arrangement name, an error cause (e.g. in-use user and used system name) and years, months, days, hours, minutes and seconds on which the error occurs.

In step S16, the RM image backup unit 22 backs up an RM image of the physical machine 2 of the arrangement name, which is designated by a web browser, into the RM management master DB 11 (step S16). Subsequently, the RM image writing unit 23 acquires the RM image designated by the web browser from the RM management master DB 11 and writes the acquired RM image in the physical machine 2 of the switching target (step S17).

After that, regarding the physical machine 2 of the switching target, the RM startup unit 24 starts up the RM (step S18). Subsequently, regarding the physical machine 2 of the switching target, the RM startup unit 24 updates information of the RM management table 12 in the RM management master DB 11 (step S19). For example, the RM startup unit 24 updates management information of the RM deployed in the physical machine 2 of the switching target and a startup state of the RM. The RM management information includes, for example, the IP address 12c, the correspondence system 12f, the installed OS 12g and the image file name 12i of the RM management table 12, which correspond to the arrangement name of the switching target. The RM startup state includes, for example, the operation state 12d of the RM management table 12, which corresponds to the arrangement name of the switching target.

Steps of RM Image Backup Processing

Figure 5:
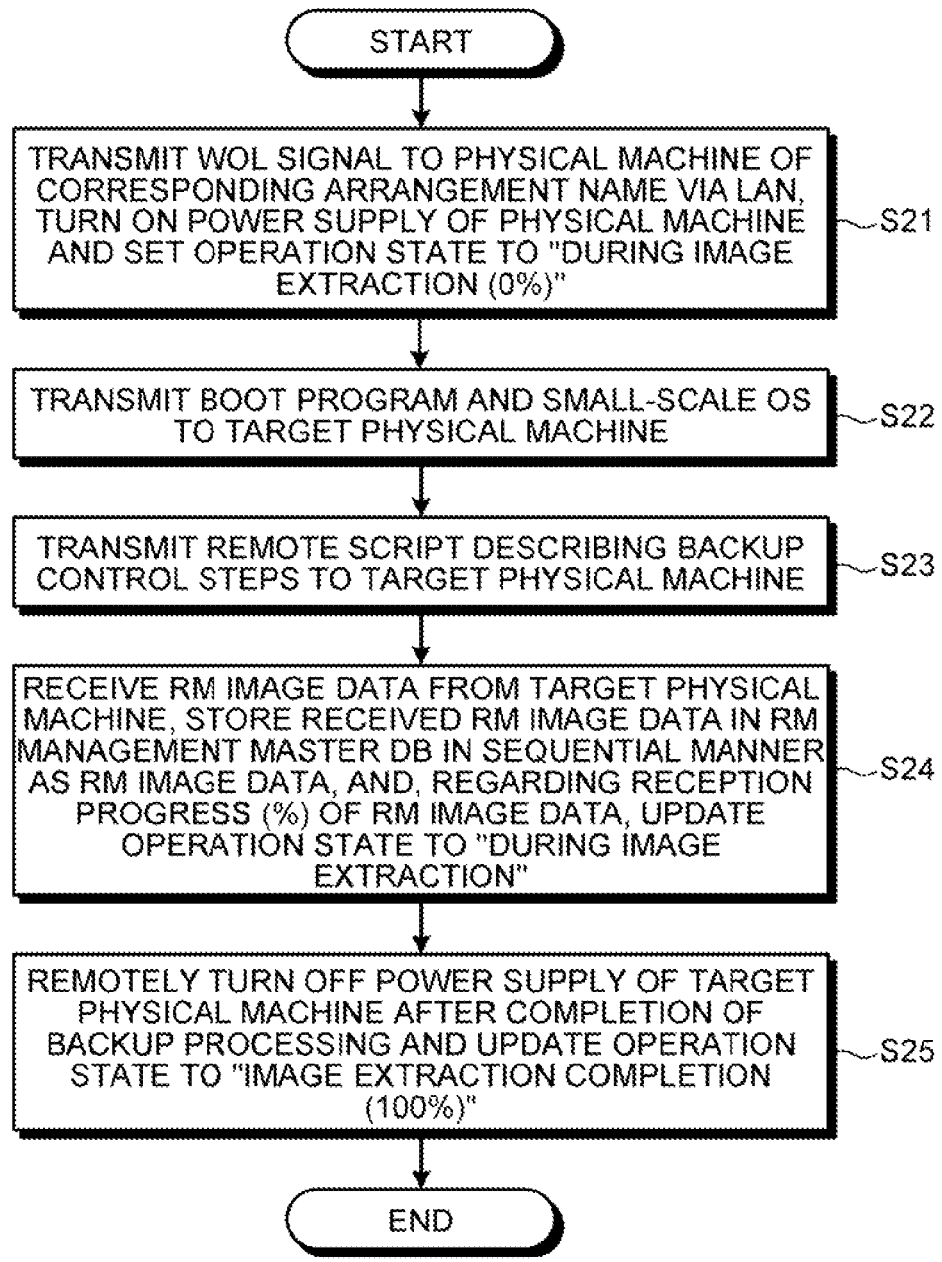
FIG. 5 is a flowchart illustrating RM image backup processing.

Next, RM image backup processing performed by the RM image backup unit 22 will be explained. FIG. 5 is a flowchart illustrating the RM image backup processing.

The RM image backup unit 22 transmits a WOL signal to the physical machine 2 of a corresponding arrangement name via LAN and turns on a power supply of the physical machine 2. Subsequently, the RM image backup unit 22 sets the operation state 12d of the RM management table 12, which corresponds to the corresponding arrangement name, to "during image extraction (0%)" (step S21). At this time, the RM image backup unit 22 records the backup state in the operation log 14.

Subsequently, the RM image backup unit 22 transmits a boot program and a small-scale OS to the target physical machine 2 such that a network boot is performed in the physical machine (step S22). Subsequently, the RM image backup unit 22 transmits a remote script describing backup control steps, to the target physical machine 2 (step S23).

As a result of executing the remote script by the target physical machine 2, the RM image backup unit 22 receives RM image data from the target physical machine 2 and stores the received RM image data in the RM management master DB 11 in a sequential manner. Subsequently, regarding reception progress (%) of the RM image data, the RM image backup unit 22 updates the operation state 12d of the RM management table 12, which corresponds to a corresponding arrangement name (step S24). The operation state 12d is set with "during image extraction" and the reception progress (%) expressed in percentage. At this time, the RM image backup unit 22 records the backup state in the operation log 14.

After that, when receiving a report from the target physical machine that the RM image extraction is completed, the RM image backup unit 22 remotely turns off the power supply of the physical machine 2. Subsequently, the RM image backup unit 22 updates the operation state 12d of the RM management table 12, which corresponds to the corresponding arrangement name, to "image extraction completion (100%)" (step S25). At this time, the RM image backup unit 22 records the backup state in the operation log 14.

Also, the operation log 14 of the RM image backup unit 22 records, for example, an authorized user name, an arrangement name, an RM host name, an image file name, years, months, days, hours, minutes and seconds on which the image extraction starts, and years, months, days, hours, minutes and seconds on which the image extraction ends.

Steps of RM Image Writing Processing

Figure 6:
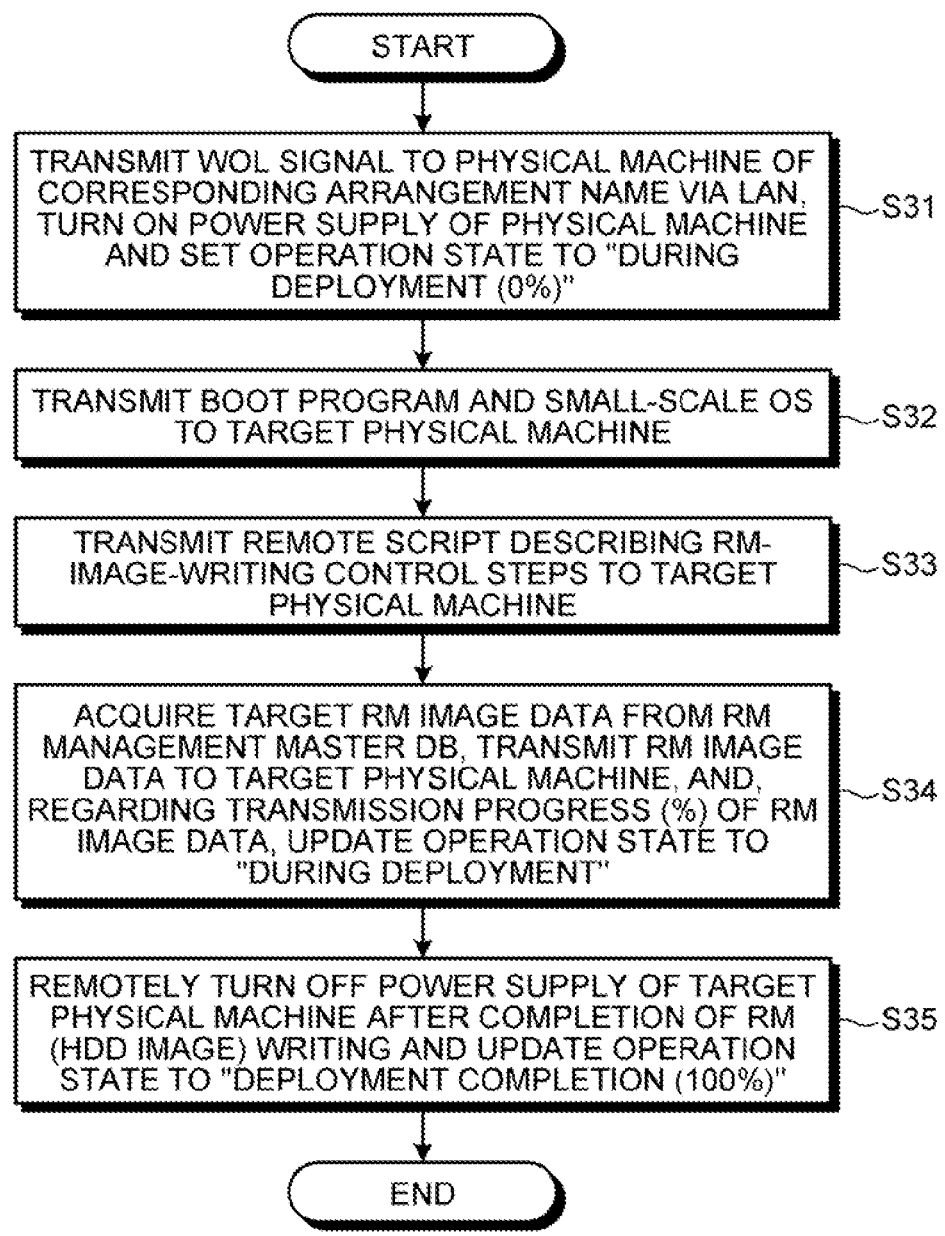
FIG. 6 is a flowchart illustrating RM image writing processing.

Next, RM image writing processing performed by the RM image writing unit 23 will be explained. FIG. 6 is a flowchart illustrating the RM image writing processing.

The RM image writing unit 23 transmits a WOL signal to the physical machine 2 of a corresponding arrangement name via the LAN and turns on a power supply of the physical machine 2. Subsequently, the RM image writing unit 23 sets the operation state 12d of the RM management table 12, which corresponds to the corresponding arrangement name, to "during deployment (0%)" (step S31). At this time, the RM image writing unit 23 records the RM image writing state in the operation log 14.

Subsequently, the RM image writing unit 23 transmits a boot program and a small-scale OS to the target physical machine 2 such that a network boot is performed in the physical machine 2 (step S32). Subsequently, the RM image writing unit 23 transmits a remote script describing RM-image-writing control steps, to the target physical machine 2 (step S33).

Subsequently, when receiving a notification from the target physical machine 2 that the transfer of an RM image is awaited, the RM image writing unit 23 acquires the target RM image data designated by the web browser from the RM management master DB 11 and transmits the acquired RM image data to the target physical machine 2. Subsequently, regarding transmission progress (%) of the RM image data, the RM image writing unit 23 updates the operation state 12d of the RM management table 12, which corresponds to a corresponding arrangement name (step S34). The operation state 12d is set with "during deployment" and the transmission progress (%) expressed in percentage. At this time, the RM image writing unit 23 records the RM image writing state in the operation log 14.

After that, when the RM image from the RM management master DB 11 has been acquired, the RM image writing unit 23 remotely turns off the power supply of the target physical machine 2. Subsequently, the RM image writing unit 23 updates the operation state 12d of the RM management table 12, which corresponds to the corresponding arrangement name, to "deployment completion (100%)" (step S35). At this time, the RM image writing unit 23 records the RM image writing state in the operation log 14.

Also, the operation log 14 of the RM image writing unit 23 records, for example, an authorized user name, an arrangement name, an RM host name, an image file name, years, months, days, hours, minutes and seconds on which the image writing starts, and years, months, days, hours, minutes and seconds on which the image writing ends.

Steps of RM Startup Processing

Figure 7:
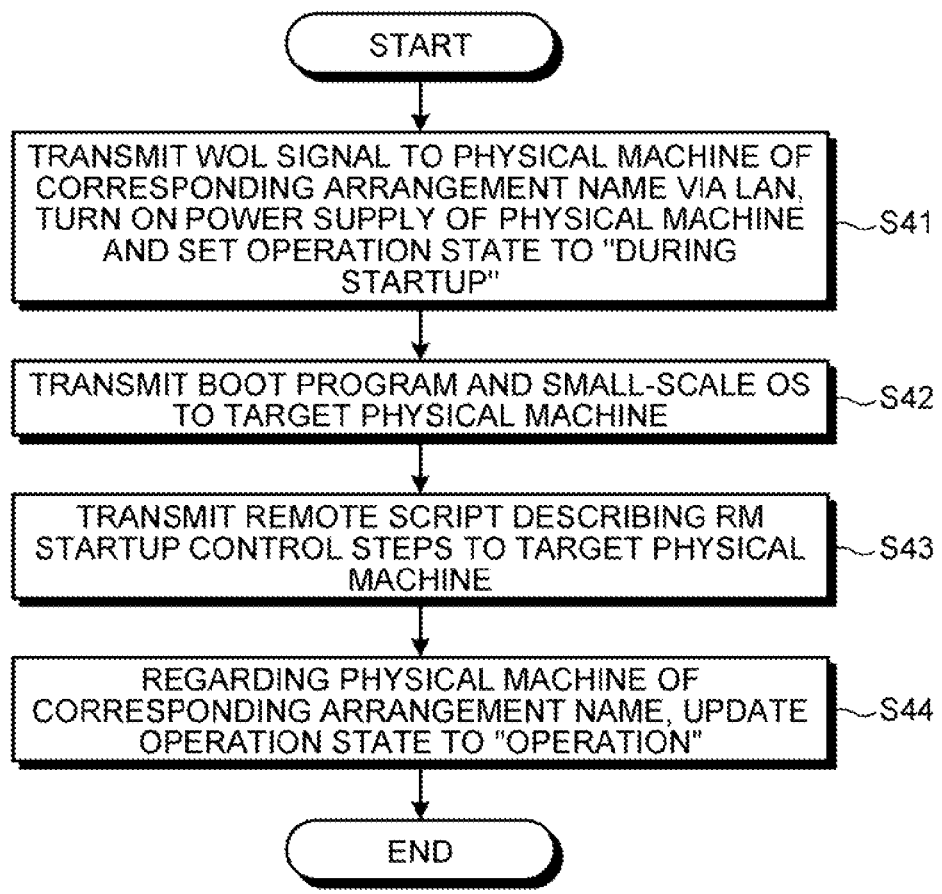
FIG. 7 is a flowchart illustrating RM startup processing.

Next, RM startup processing performed by the RM startup unit 24 will be explained. FIG. 7 is a flowchart illustrating the RM startup processing.

The RM startup unit 24 transmits a WOL signal to the physical machine 2 of a corresponding arrangement name via the LAN and turns on a power supply of the physical machine 2. Subsequently, the RM startup unit 24 sets the operation state 12d of the RM management table 12, which corresponds to the corresponding arrangement name, to "during startup" (step S41). At this time, the RM startup unit 24 records the RM startup state in the operation log 14.

Subsequently, the RM startup unit 24 transmits a boot program and a small-scale OS to the target physical machine 2 such that a network boot is performed in the physical machine (step S42). Subsequently, the RM startup unit 24 transmits a remote script describing RM startup control steps, to the target physical machine 2 (step S43).

After that, when receiving a signal from the target physical machine 2 notifying that the operation starts, the RM startup unit 24 updates the operation state 12d of the RM management table 12, which corresponds to the corresponding arrangement name, to "operation" (step S44). At this time, the RM startup unit 24 records the RM startup state in the operation log 14.

Also, the operation log 14 of the RM startup unit 24 records, for example, an authorized user name, an arrangement name, an RM host name and years, months, days, hours, minutes and seconds on which the RM is started up.

Steps of RM Stop Processing

Figure 8:
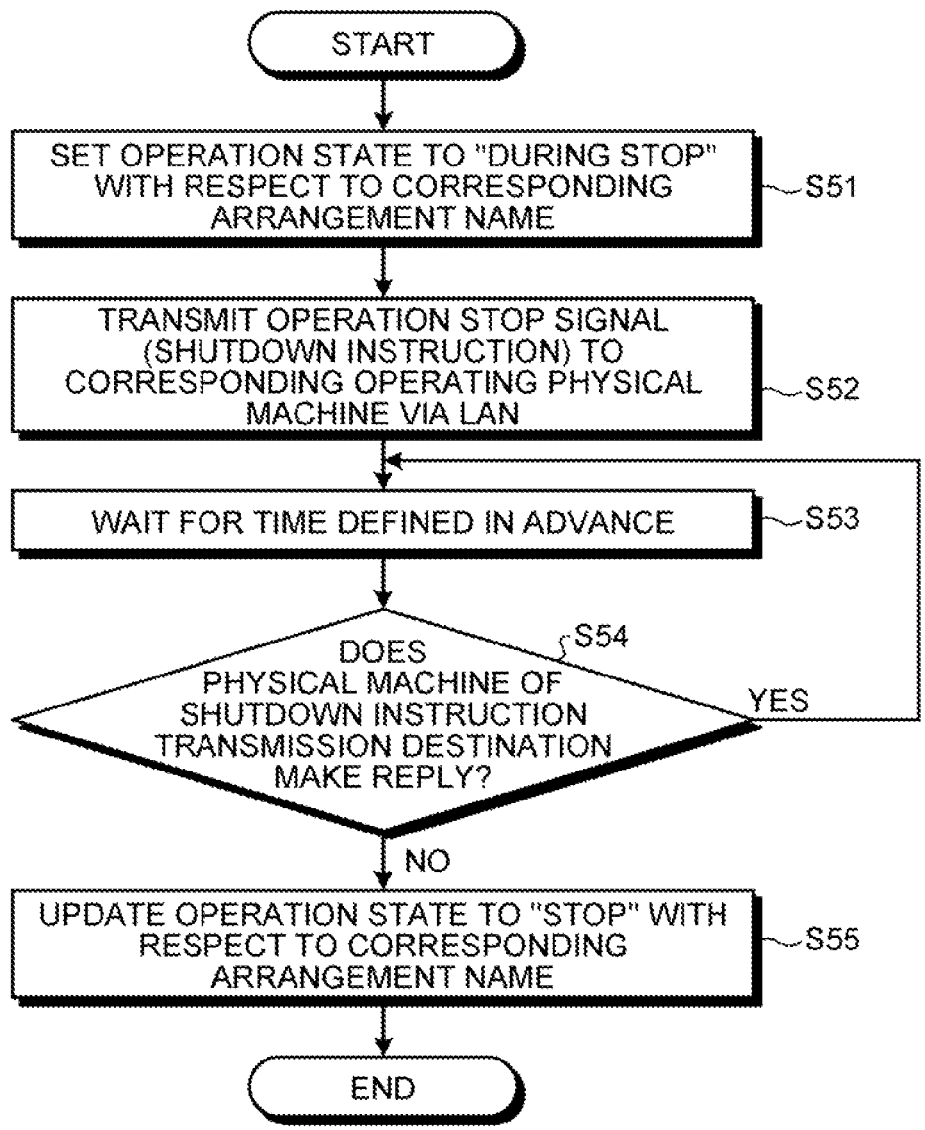
FIG. 8 is a flowchart illustrating RM stop processing.

Next, RM stop processing performed by the RM stop unit 25 will be explained. FIG. 8 is a flowchart illustrating the RM stop processing.

The RM stop unit 25 sets the operation state 12*d* of the RM management table 12, which corresponds to a corresponding arrangement name, to "during stop" (step S51). At this time, the RM stop unit 25 records the RM stop state in the operation log 14.

Subsequently, the RM stop unit 25 transmits an operation stop signal (i.e. shutdown instruction) to the corresponding operating physical machine 2, via the LAN (step S52). This is done to shut down (i.e. stop) the corresponding physical machine. At this time, the RM stop unit 25 records the RM stop state in the operation log 14.

Next, the RM stop unit 25 waits for a time defined in advance (step S53). Subsequently, the RM stop unit 25 decides whether the physical machine 2 of the shutdown instruction transmission destination does not make a reply (step S54). When it is decided that the physical machine 2 of the shutdown instruction transmission destination makes a reply (Yes in step S54), the RM stop unit 25 proceeds to step S53 to wait.

Meanwhile, when it is decided that the physical machine 2 of the shutdown instruction transmission destination does not make a reply (No in step S54), the RM stop unit 25 updates the operation state 12*d* of the RM management table 12, which corresponds to the corresponding arrangement name, to "stop" (step S55). At this time, the RM stop unit 25 records the RM stop state in the operation log 14.

Also, the operation log 14 of the RM stop unit 25 records, for example, an authorized user name, an arrangement name, an RM host name and years, months, days, hours, minutes and seconds on which the RM is stopped.

Sequence of RM Image Backup

Figure 9:
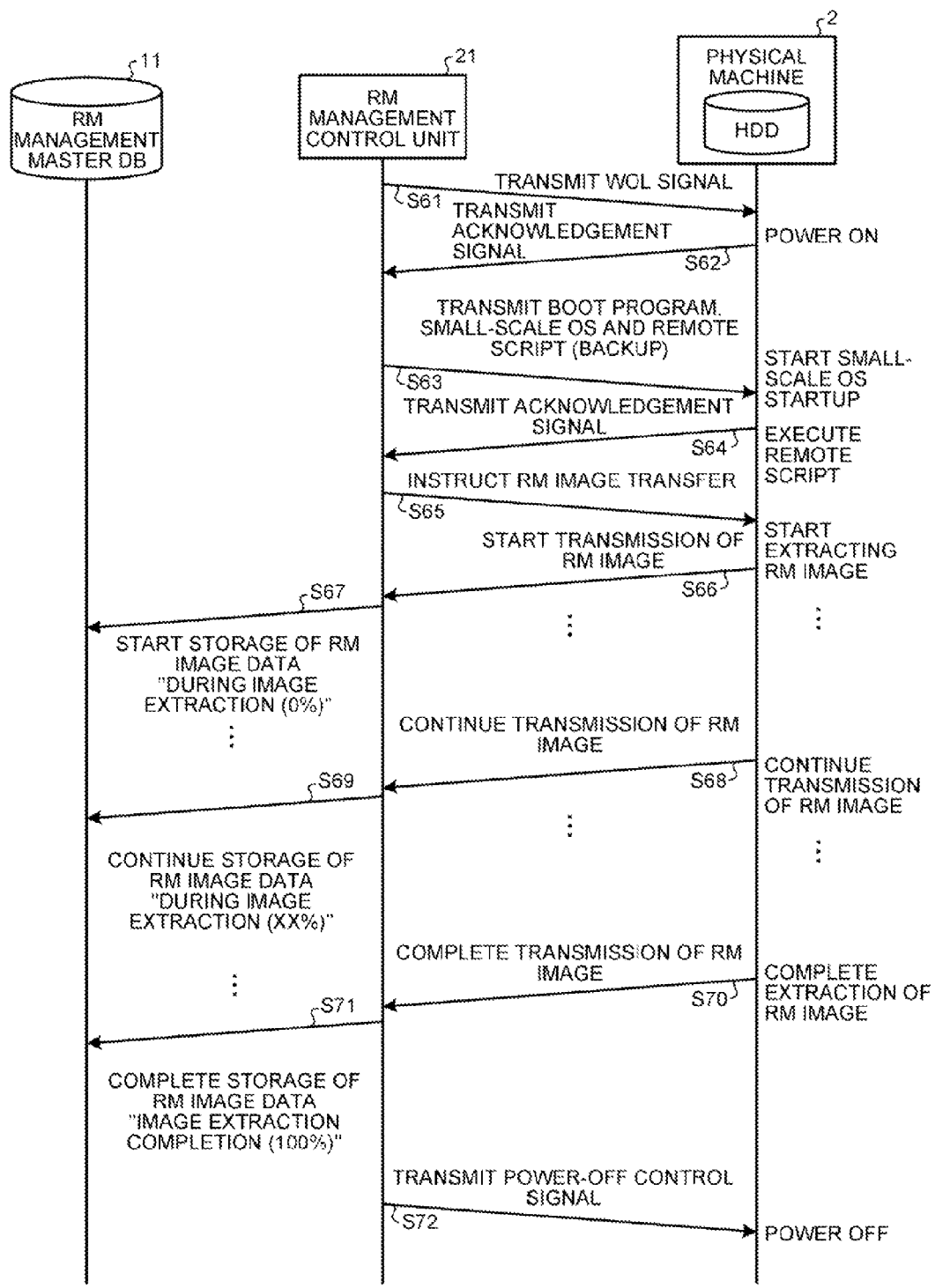
FIG. 9 is a view illustrating a sequence of RM image backup.

Next, a sequence of RM image backup performed by the migration control system 9 will be explained. FIG. 9 is a view illustrating a sequence of RM image backup.

First, the RM management control unit 21 transmits a WOL signal to the physical machine 2 of a corresponding arrangement name via the LAN (step S61). The physical machine 2 whose power supply is turned on by the WOL signal transmits an acknowledgement signal to the RM management control unit 21 that transmitted the WOL signal (step S62).

Subsequently, the RM management control unit 21 transmits a boot program, a small-scale OS and a remote script describing backup control steps, to the physical machine 2 (step S63). The physical machine 2, which is started up by the transmitted boot program and small-scale OS, transmits an acknowledgement signal (step S64).

The RM management control unit 21 having received the acknowledgement signal instructs a transfer of an RM image (HDD image) of the target physical machine 2 (step S65). When executing the transmitted remote script, the target physical machine 2 continuously extracts content of storage incorporated in the own machine and transmits the extracted content, that is, RM image data to the RM management control unit 21 via the LAN (steps S66 and S68).

The RM management control unit 21 having received the RM image data stores the received RM image data in the RM management master DB 11 in order. At this time, regarding reception progress (%) of the RM image data, the RM management control unit 21 updates the operation state 12*d* of the RM management table 12, which corresponds to the arrangement name of the target physical machine 2 (steps S67 and S69). The operation state 12*d* is set with "during image extraction" and the reception progress (%) expressed in percentage.

Subsequently, when accepting an RM image data transmission completion (step S70) from the physical machine 2, the RM management control unit 21 stores the RM image data that was finally received, in the RM management master DB 11. At this time, the RM management control unit 21 updates the operation state 12*d* of the RM management table 12, which corresponds to the corresponding arrangement name, to "image extraction completion (100%)" (step S71). Subsequently, the RM management control unit 21 transmits a power-off control signal to the physical machine 2 of the corresponding arrangement name via the LAN (step S72). The power supply of the target physical machine 2 is turned off by the power-off control signal.

Sequence of RM Image Writing

Figure 10:
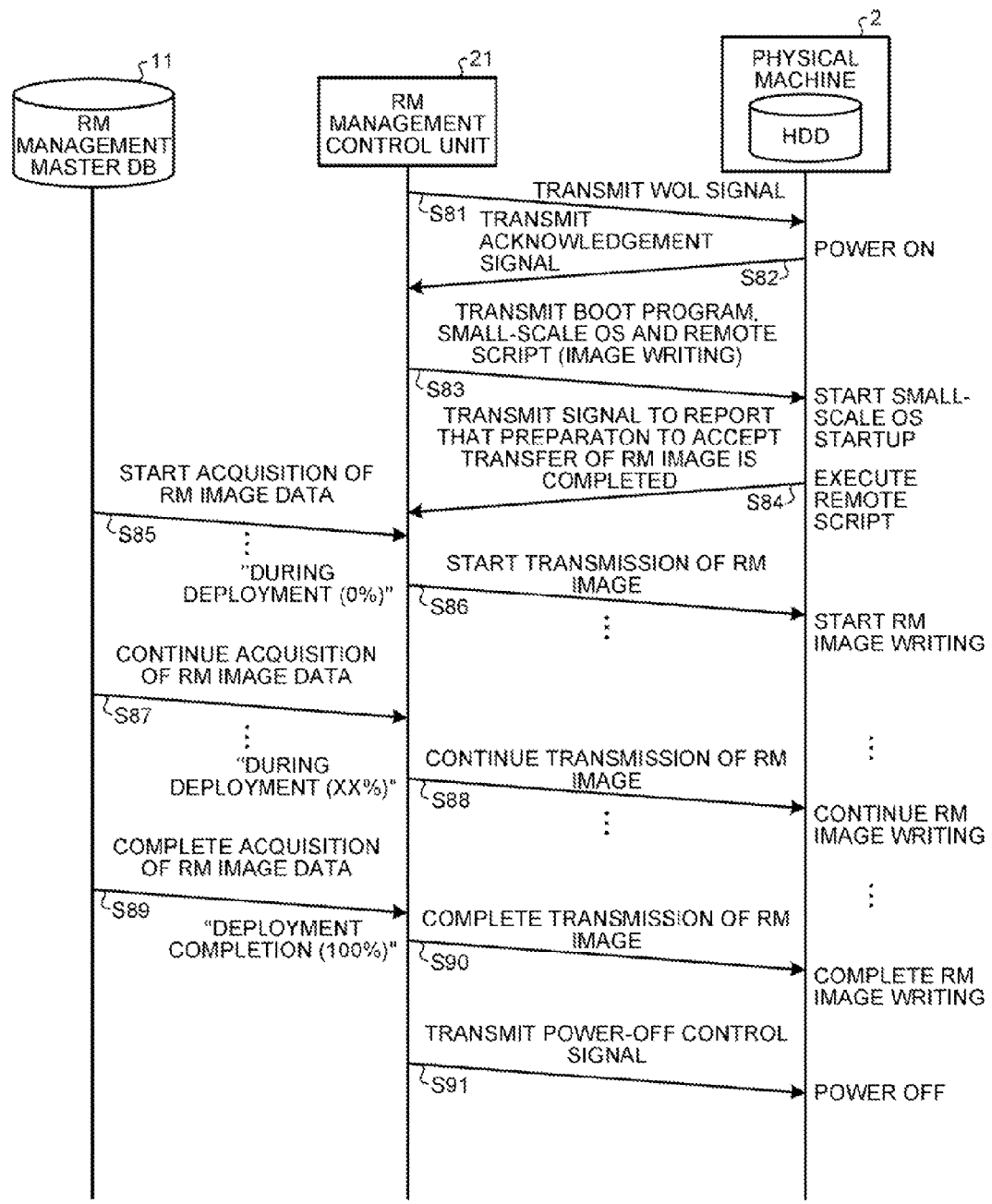
FIG. 10 is a view illustrating a sequence of RM image writing processing.

Next, a sequence of RM image writing performed by the migration control system 9 will be explained. FIG. 10 is a view illustrating a sequence of the RM image writing processing.

First, the RM management control unit 21 transmits a WOL signal to the physical machine 2 of a corresponding arrangement name via the LAN (step S81). The physical machine 2 whose power supply is turned on by the WOL signal transmits an acknowledgement signal to the RM management control unit 21 that transmitted the WOL signal (step S82).

Subsequently, the RM management control unit 21 transmits a boot program, a small-scale OS and a remote script describing RM-image-writing control steps, to the physical machine 2 (step S83). The physical machine 2, which is started up by the transmitted boot program and small-scale OS, executes the transmitted remote script. Subsequently, the physical machine 2 transmits to the RM management control unit 21 a signal to report that a ready to accept the transfer of an RM image (HDD image) is completed (step S84).

The RM management control unit 21, which received the signal to report that a ready to accept the transfer of an RM image is completed, acquires the target RM image data designated by the web browser from the RM management master DB 11 (steps S85 and S87). Subsequently, the RM management control unit 21 transmits the acquired RM image data to the target physical machine 2 (steps S86 and S88). At this time, regarding transmission progress (%) of the RM image data, the RM management control unit 21 updates the operation state 12*d* of the RM management table 12, which corresponds to the arrangement name of the target physical machine 2. The operation state 12*d* is set with "during deployment" and the transmission progress (%) expressed in percentage. Meanwhile, the target physical machine 2 receives the RM image data and continuously writes the received RM image data in the storage (HDD) incorporated in the own machine.

Subsequently, when completing the acquisition of the RM image data (step S89), the RM management control unit 21 transmits the RM image data, which was finally acquired, to the target physical machine 2 (step S90). At this time, the RM management control unit 21 updates the operation state 12*d* of the RM management table 12, which corresponds to the corresponding arrangement name, to "deployment completion (100%)." Subsequently, the RM management control unit 21 transmits a power-off control signal to the physical machine 2 of the corresponding arrangement name via the LAN (step S91). The power supply of the target physical machine 2 is turned off by the power-off control signal.

Sequence of RM Startup

Figure 11:
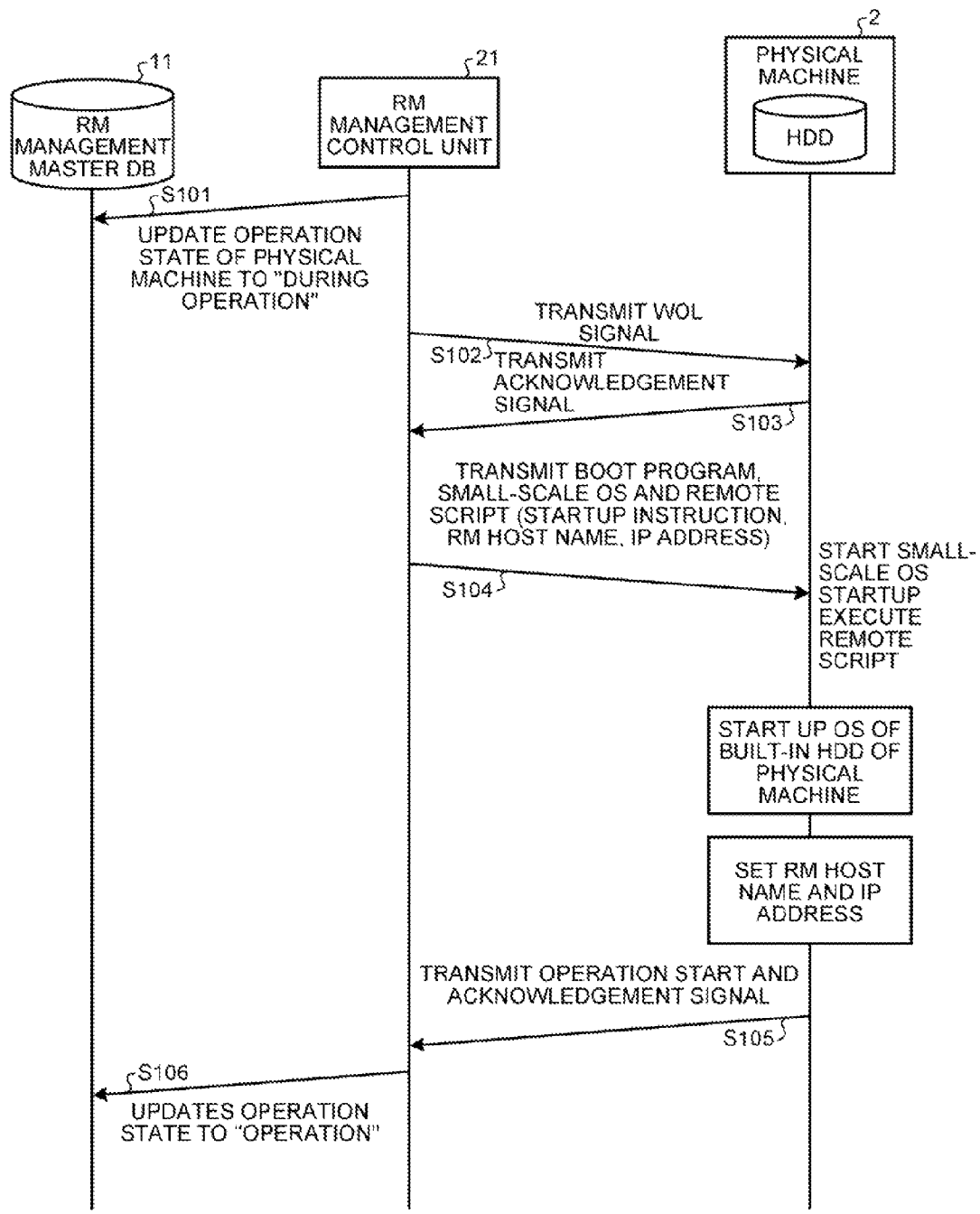
FIG. 11 is a view illustrating a sequence of RM startup processing.

Next, a sequence of RM startup performed by the migration control system 9 will be explained. FIG. 11 is a view illustrating a sequence of the RM startup.

The RM management control unit 21 updates the operation state 12d of the RM management table 12, which corresponds to the arrangement name of the physical machine 2 to be started up, to "during startup" (step S101). Subsequently, the RM management control unit 21 transmits a WOL signal to the physical machine 2 of the corresponding arrangement name via the LAN (step S102). The physical machine 2 whose power supply is turned on by the WOL signal transmits an acknowledgement signal to the RM management control unit 21 that transmitted the WOL signal (step S103).

Subsequently, the RM management control unit 21 transmits a boot program, a small-scale OS and a remote script describing RM startup control steps, to the target physical machine 2 (step S104). In a case of startup immediately after RM deployment, the RM management control unit 21 embeds an RM host name and IP address, which are set at the time of OS startup, in the remote script.

When executing the transmitted remote script, the target physical machine 2 starts up an OS written in the storage incorporated in the own machine. In the case of startup immediately after RM deployment, the target physical machine 2 sets an RM host name and IP address. Subsequently, the target physical machine 2 transmits an operation start and acknowledgement signal to the RM management control unit 21 (step S105).

The RM management control unit 21 having received the operation start and acknowledgment signal updates the operation state 12d of the RM management table 12, which corresponds to the corresponding arrangement name, to "operation" (step S106).

Sequence of RM Stop

Figure 12:
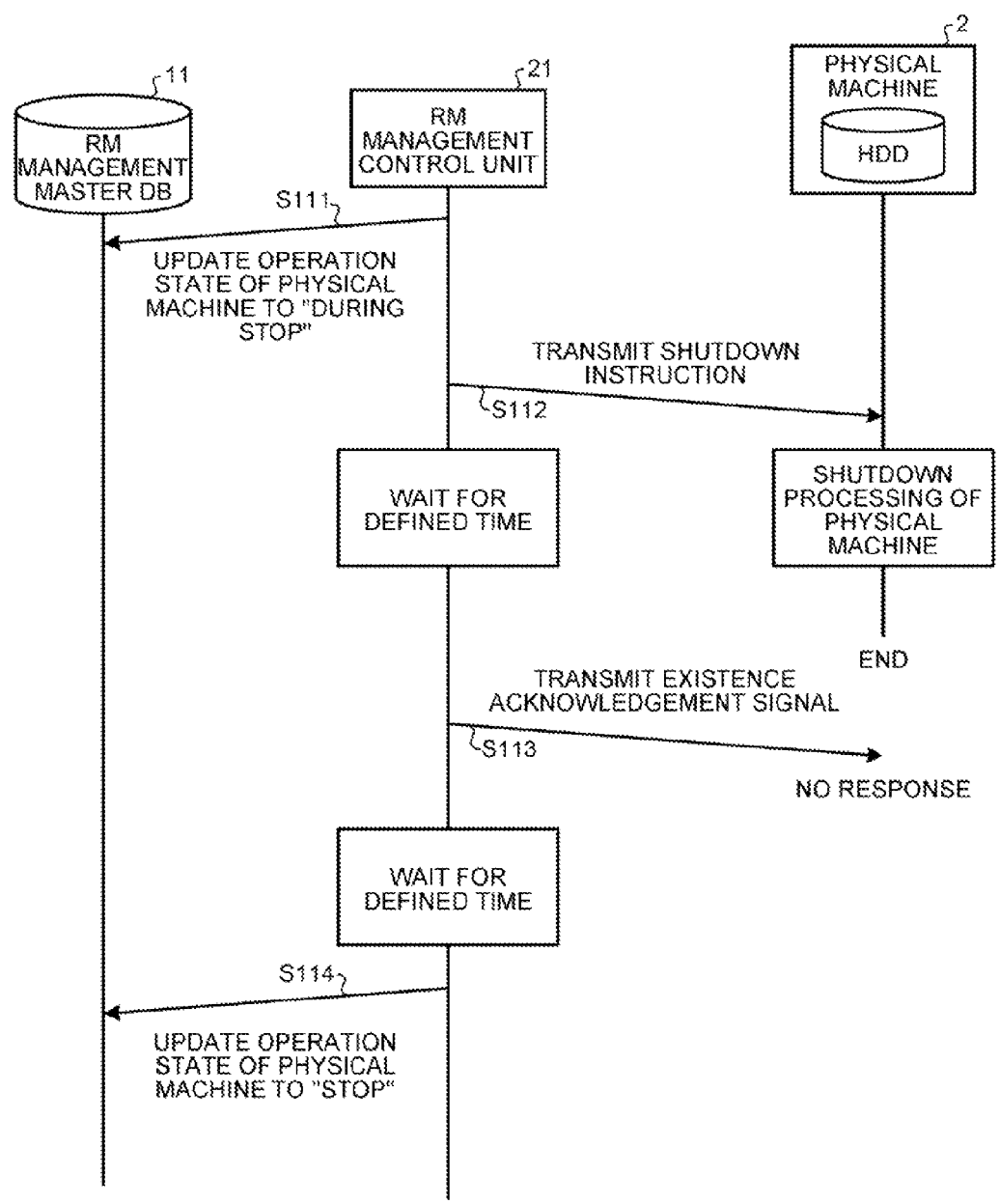
FIG. 12 is a view illustrating a sequence of RM stop processing.

Next, a sequence of RM stop performed by the migration control system 9 will be explained. FIG. 12 is a view illustrating the sequence of RM stop.

The RM management control unit 21 updates the operation state 12d of the RM management table 12, which corresponds to an arrangement name of the physical machine 2 to be stopped, to "during stop" (step S111). Further, the RM management control unit 21 transmits a shutdown instruction to the physical machine 2 of the corresponding arrangement name via the LAN (step S112). The physical machine 2 having received the shutdown instruction performs shutdown processing.

After the transmission of the shutdown instruction, the RM management control unit 21 waits for a time defined in advance, and, after the wait, transmits an existence acknowledgement signal to the target physical machine 2 (step S113). Subsequently, in a case where the target physical machine 2 does not make a reply in the waiting time defined in advance, the RM management control unit 21 decides that the physical machine 2 stops, and updates the operation state 12d of the RM management table 12, which corresponds to the corresponding arrangement name, to "stop" (step S114).

Advantage of First Embodiment

In above the first embodiment, the server 1 moves a storage image of the physical machine 2, which is currently used as a virtual machine environment, to the RM management master DB 11. Subsequently, after a completion of the move, the server 1 writes a new storage image including an OS, in the physical machine 2 in which the move is completed, so as to be used as a physical machine environment. With such a configuration, the server 1 can use the physical machine 2, which was used as the virtual machine environment, as the physical machine environment, and therefore it is possible to speed up batch processing if the batch processing is performed. Also, the server 1 moves the storage image of the physical machine 2 and writes a new storage image including an OS, in the physical machine 2, and therefore it is possible to shift a machine environment on the physical machine 2.

Also, in above the first embodiment, the server 1 backs up a storage image of the physical machine 2 that is currently used as a virtual machine environment, into the RM management master DB 11. Subsequently, the server 1 acquires a storage image of a physical machine environment, which includes an OS, from the RM management master DB 11, and writes the acquired image in the physical machine 2 for which the backup is completed. Subsequently, after a completion of the writing, the server 1 starts up the physical machine 2 for which the writing is completed. With such configuration, by writing a storage image of the physical machine environment, which includes an OS, in the physical machine 2 and subsequently starting up it, the server 1 can perform batch processing in the physical machine environment, and therefore it is possible to increase the processing speed of the batch processing.

Also, in above the first embodiment, the server 1 backs up a storage image of the physical machine 2, which is currently used as a virtual machine environment, into the RM management master DB 11 and causes the physical machine 2, for which the backup is completed, to be used as a physical machine environment. However, the server 1 is not limited to this and may back up a storage image of the physical machine 2, which is currently used as a physical machine environment, into the RM management master DB 11 and cause the physical machine 2, for which the backup is completed, to be used as a virtual machine environment. In such a case, the server 1 backs up a storage image of an OS of the physical machine 2, which is currently used as the physical machine environment, into the RM management master DB 11. Subsequently, regarding the physical machine 2 for which the backup is completed, the server 1 acquires RM images of VMP and VM, which are designated from the web browser or the like, from the RM management master DB 11 and writes the acquires RM images in the physical machine 2 for which the backup is completed. By this means, the server 1 can cause the physical machine 2 as the physical machine environment to be used as the virtual machine environment.

[b] Second Embodiment

By the way, a case has been described where the server 1 according to the first embodiment stops a virtual machine environment of the physical machine 2 of a switching target and subsequently switches the machine environment of the physical machine 2 from the virtual machine environment to a physical machine environment. However, the server 1 is not limited to this and may switch the machine environment of the physical machine 2 from the virtual machine environment to the physical machine environment without stopping the virtual machine environment of the physical machine 2 of the switching target. Therefore, a case will be explained in a second embodiment where the server 1 switches the machine environment of the physical machine 2 from the virtual machine environment to the physical machine environment without stopping the virtual machine environment of the physical machine 2 of the switching target.

Configuration of Migration Control System According to Second Embodiment

Figure 13:
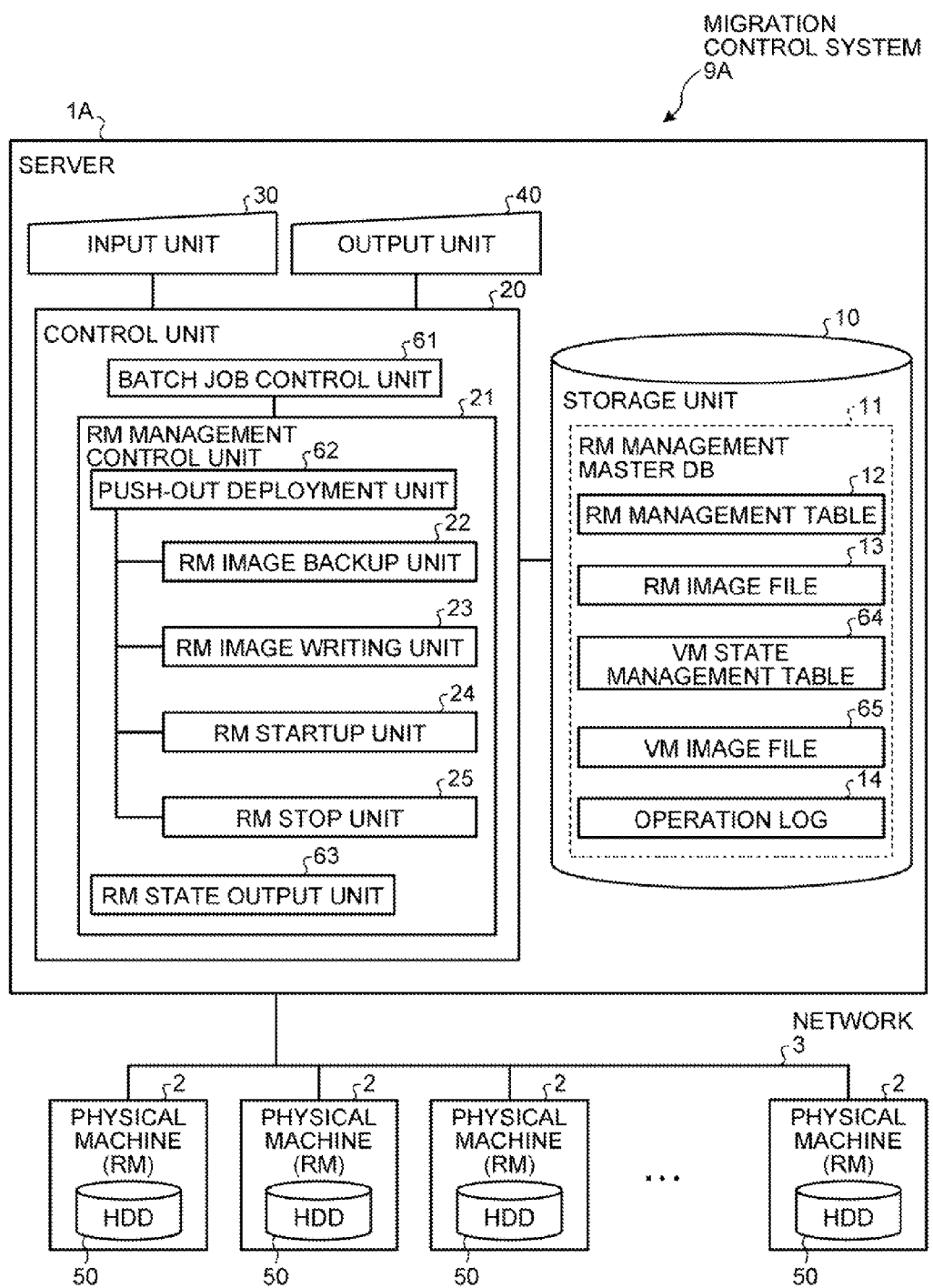
FIG. 13 is a functional block diagram illustrating a configuration of a migration control system according to a second embodiment.

First, a configuration of a migration control system 9A will be explained with reference to FIG. 13. FIG. 13 is a functional block diagram illustrating a configuration of the migration control system according to the second embodiment. Here, the identical reference numerals are assigned to the same components as those of the migration control system 9 illustrated in FIG. 1 and the overlapping components and operations will be omitted. The second embodiment differs from the first embodiment in adding a batch job control unit 61, a push-out deployment unit 62 and an RM state output unit 63 to the control unit 20. Further, the second embodiment differs from the first embodiment in adding a VM state management table 64 and a VM image file 65.

The batch job control unit 61 controls batch jobs included in batch processing. For example, when the number of batch jobs remaining in a queue exceeds a number set in advance, the batch job control unit 61 outputs a resource allocation request to the RM management control unit 21 so as to increase the number of allocated physical-machine-environment RM's as calculation servers for batch jobs. Also, when the number of batch jobs remaining in the queue becomes 0, the batch job control unit 61 outputs a resource release request to the RM management control unit 21 so as to decrease the number of allocated physical-machine-environment RM's as calculation servers for batch jobs. Also, the batch job control unit 61 instructs the RM management control unit 21 to lock a deployed RM when a batch job is currently performed in the RM, and release the lock on the deployed RM when the batch job is idling (standby) in the RM.

The push-out deployment unit 62 determines the physical machine 2 in which the virtual machine environment is pushed out, among the physical machines 2 that are currently used as the virtual machine environments, based on the CPU utilization calculated for each of the physical machines 2. For example, the push-out deployment unit 62 refers to the correspondence system 12f of the RM management table 12 with respect to all deployed RM's, and extracts only RM's with the VMP's deployed. In the case of RM's with the VMP's deployed, the correspondence system 12f of the RM management table 12 stores the VMP types, and therefore the push-out deployment unit 62 refers to the correspondence system 12f and extracts RM's whose VMP types are stored. Subsequently, among the extracted RM's, the push-out deployment unit 62 excludes a locked (i.e. not in an idling state) RM. Also, even in a case where it is unlocked, the push-out deployment unit 62 excludes an RM in which there is at least one VM having a migration load attribute. Whether there is a VM having a migration load attribute is decided using the VM state management table 64 (described later). Subsequently, the push-out deployment unit 62 classifies each RM which is not excluded, into the VMP groups according to VMP types, based on the correspondence system 12f of the RM management table 12. Further, regarding each RM that is not excluded, the push-out deployment unit 62 calculates the average CPU utilization per unit time of all included VM's. Subsequently, using the calculated average CPU utilization of each VM, the push-out deployment unit 62 sorts the RM's in order from the RM of the lowest CPU utilization for every VMP group. Subsequently, the push-out deployment unit 62 determines an RM in a VMP group in which there are many VM's with a low average CPU utilization, as the physical machine 2 whose virtual machine environment is pushed out.

Also, the push-out deployment unit 62 pushes out (moves) a VM storage image of the determined physical machine 2 to another physical machine 2 that is currently used as a virtual machine environment, without stop. Thus, a technique of moving a VM to another VM without stopping is called "live migration" and is performed using, for example, the VM image file 65. Here, it is assumed that a VMP deployed in the migration source of the live migration is the same type as that of a VMP deployed in the migration destination.

Also, after a completion of the move, the push-out deployment unit 62 pushes out (or moves) a VMP storage image of the physical machine 2 of the migration source to the RM management master DB 11. Such processing is processed by the RM image backup unit 22. Subsequently, the push-out deployment unit 62 acquires a storage image of a physical machine environment, which includes an OS, from the RM management master DB 11 and writes the acquired image in the physical machine 2 of the migration source. Such processing is processed by the RM image writing unit 23. Subsequently, the push-out deployment unit 62 starts up the physical machine 2 of the migration source again. Such processing is processed by the RM startup unit 24. Also, processing by the RM image backup unit 22, the RM image writing unit 23 and the RM startup unit 24 has been explained in the first embodiment and therefore their explanation will be omitted.

Figure 14:
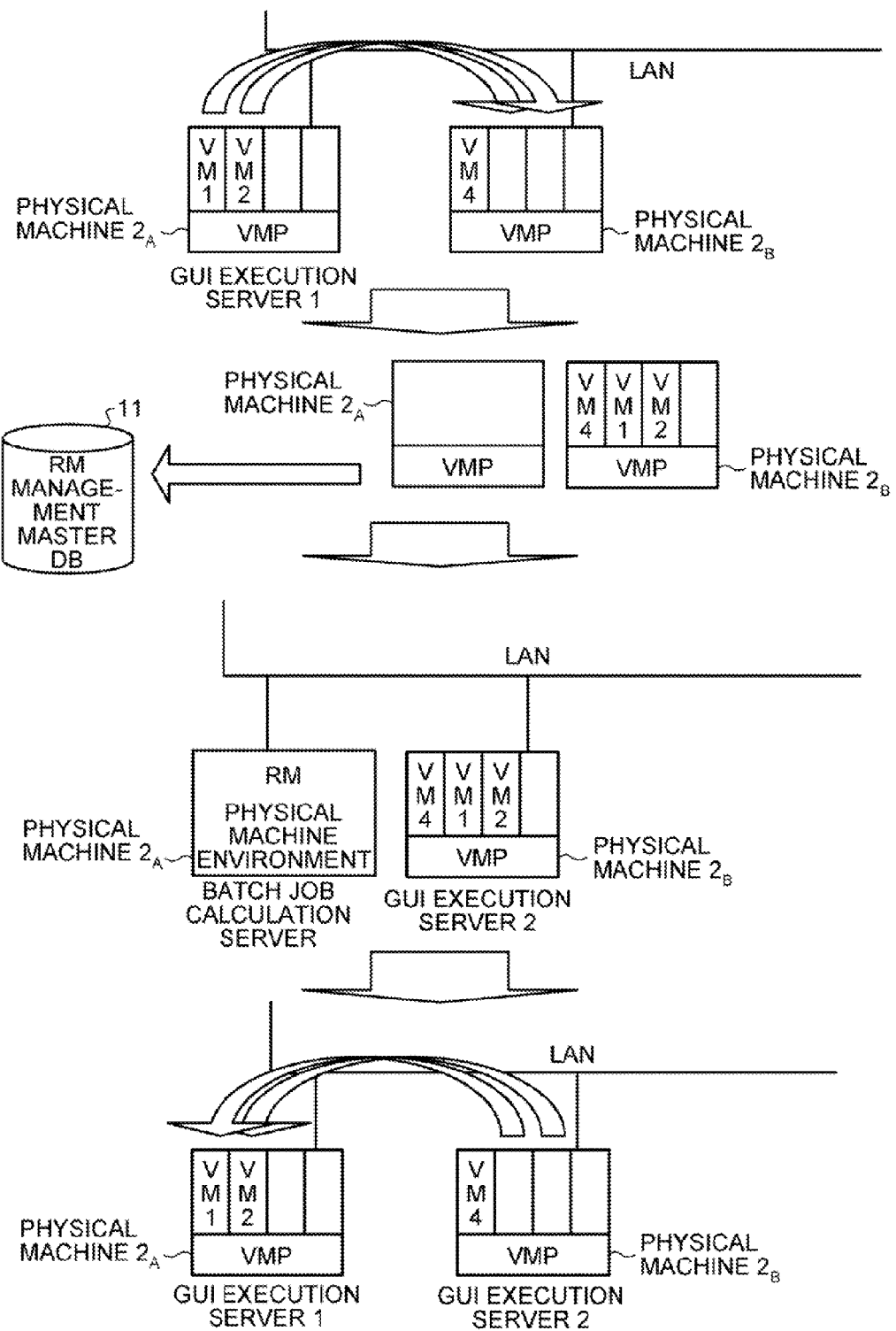
FIG. 14 is a view for explaining push-out deployment processing according to the second embodiment.

Here, push-out deployment processing by the push-out deployment unit 62 will be explained with reference to FIG. 14. FIG. 14 is a view for explaining push-out deployment processing according to the second embodiment. Also, FIG. 14 assumes that a physical machine $2_A$ is a machine whose virtual machine environment is pushed out, and a physical machine $2_B$ is a machine to accept the pushed-out virtual machine environment. In the physical machine $2_A$, a VM 1 and a VM 2 operate on a VMP. In the physical machine $2_B$, a VM4 operates on a VMP. The VMP deployed in the physical machine $2_A$ is the same type as that of the VMP deployed in the physical machine $2_B$.

First, the push-out deployment unit 62 pushes out the VM's of the physical machine $2_A$ to the physical machine $2_B$ while maintaining the operation. Here, the push-out deployment unit 62 pushes out the VM 1 and the VM 2 of the physical machine $2_A$ to the physical machine $2_B$ while maintaining the operation.

Subsequently, the push-out deployment unit 62 pushes out a VMP storage image of the physical machine $2_A$ of the migration source to the RM management master DB 11. Subsequently, the push-out deployment unit 62 writes a storage image of a physical machine environment, which includes an OS, in the physical machine $2_A$ of the migration source. During this, in the physical machine $2_B$, the pushed-out VM 1 and VM 2 continuously operate.

Subsequently, by restarting the physical machine $2_A$, the push-out deployment unit 62 deploys the physical machine $2_A$ as an RM of the physical machine environment. Further, as a calculation server for a batch job, the physical machine $2_A$ can perform the batch job.

Subsequently, for example, after a completion of the batch job, in the similar steps, the push-out deployment unit 62 returns the physical machine $2_A$ to the original state. That is, the push-out deployment unit 62 moves an OS storage image to the RM management master DB 11. Subsequently, the push-out deployment unit 62 writes the original VMP storage image in the physical machine $2_A$ of the migration source. Further, the push-out deployment unit 62 moves the VM 1 and the VM 2 of the physical machine $2_B$ to the physical machine $2_A$ while maintaining the operation.

Returning to FIG. 13, the RM state output unit 63 outputs each RM state. For example, when receiving an extraction instruction of the current management state from the browser, the RM state output unit 63 outputs each RM state to the output unit 40 based on the RM management information stored in the RM management table 12.

Next, data structures of the VM state management table 64 and the VM image file 65 will be explained with reference to FIGS. 15 and 16. FIG. 15 is a view illustrating an example of the data structure of the VM state management table according to the second embodiment. As illustrated in FIG. 15, the VM state management table 64 stores an arrangement name 64a, a VM move enable/disable flag 64b and a maximum definition value of VM average CPU utilization 64c in association with one another. As illustrated in FIG. 15, the arrangement name 64a represents the name to identify a physical machine itself deployed as an RM. The VM move enable/disable flag 64b represents a flag indicating whether it is possible to move each VM included in the RM indicated by the arrangement name 64a. For example, if the move is enabled, "enable" is set, and, if the move is disabled, "disable" is set. The maximum definition value of VM average CPU utilization 64c indicates the maximum value by which it is possible to increase the overall average CPU utilization for all VM's in the RM indicated by the arrangement name 64a. As an example, in a case where the arrangement name 64a is "vnode005," the VM move enable/disable flag 64b stores "enable" in the first VM and "enable" in the second VM. Also, the maximum definition value of VM average CPU utilization 64c stores "20" percent. That is, it indicates that it is possible to further increase the average CPU utilization by 20%.

FIG. 16 is a view illustrating an example of the data structure of the VM image file according to the second embodiment. As illustrated in FIG. 16, the VM image file 65 stores a VM image file name 65a, a VM binary image 65b, a VM platform 65c, a VM platform version 65d, an installed OS 65e and a remark 65f in association with one another. The VM image file name 65a represents a file name to identify a VM image. The VM binary image 65b represents binary data of a VM image. The VM platform 65c sets a VMP identifier, for example, a VMP name. The VM platform version 65d sets a VMP version that can be set to a VM. The installed OS 65e sets an OS type and OS version of a VM image. The remark 65f sets a note.

Figure 17:
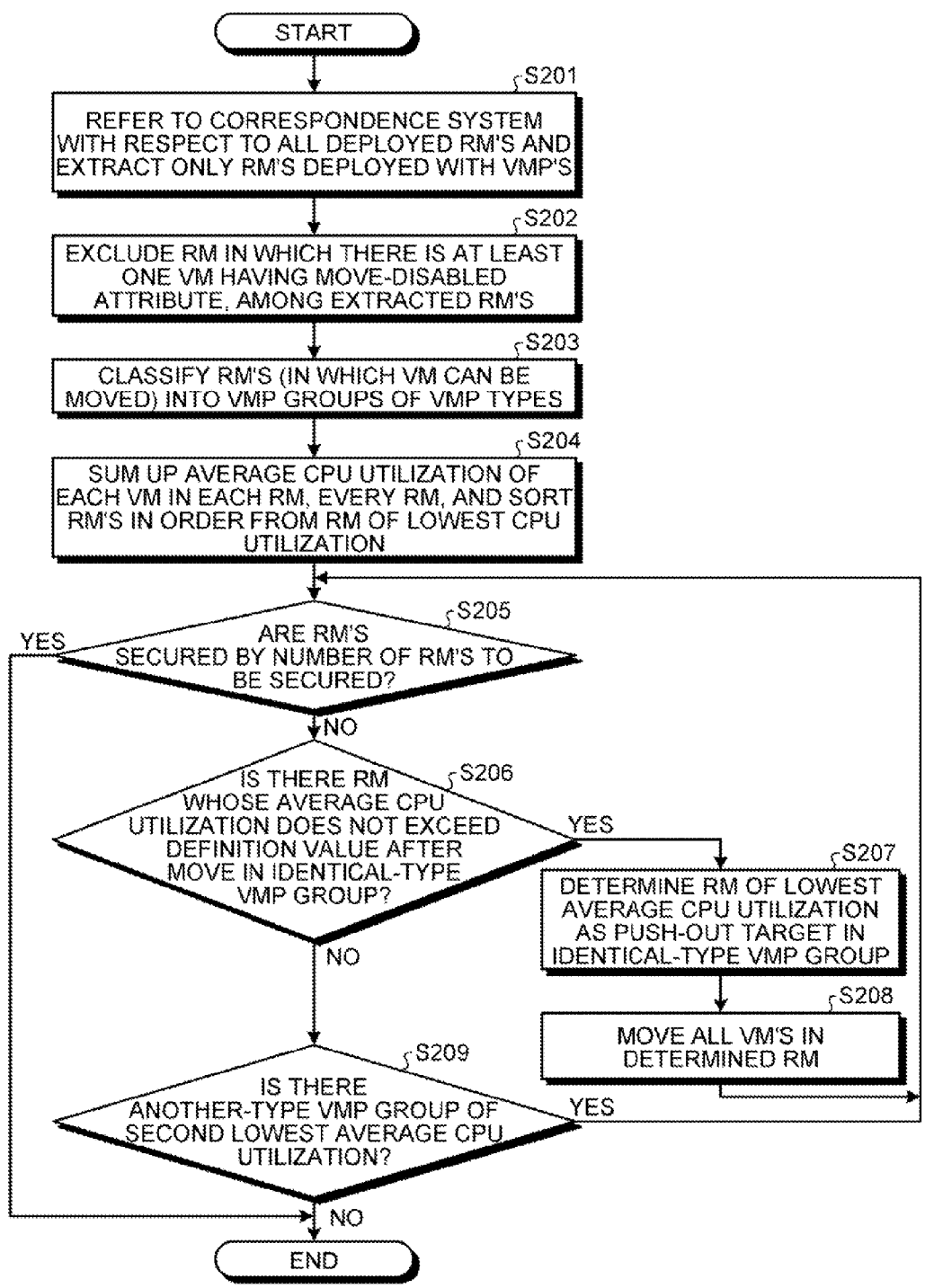
FIG. 17 is a flowchart illustrating push-out target determination processing.

Next, processing of determining a push-out target will be explained with reference to FIG. 17. FIG. 17 is a flowchart illustrating push-out target determination processing. Here, for example, the push-out deployment unit 62 starts the processing by receiving a resource allocation request output from the batch job control unit 61. It is assumed that the resource allocation request includes the number of RM's to be secured.

The push-out deployment unit 62 refers to the correspondence system 12f of the RM management table 12 with respect to all deployed RM's and extracts only RM's deployed with VMP's (step S201).

Subsequently, the push-out deployment unit 62 removes an RM in which there is at least one VM having a move-disabled attribute, among the extracted RM's (step S202). For example, the push-out deployment unit 62 removes an RM of an arrangement name in which there is at least one "disable" in the VM move enable/disable flag 64b of the VM state management table 64.

Subsequently, the push-out deployment unit 62 classifies RM's in which all VM's can be moved, into VMP groups of VMP types deployed in the RM's (step S203). For example, the push-out deployment unit 62 classifies RM's that are not excluded, for each of VMP types deployed in the RM's, based on the correspondence system 12f of the RM management table 12.

Further, the push-out deployment unit 62 sums up the average CPU utilization of each VM in each RM for every RM, and sorts the RM's in order from an RM of the lowest CPU utilization (step S204). Here, the sort is performed every VMP group.

Subsequently, the push-out deployment unit 62 decides whether RM's are secured by the number of RM's to be secured, which is included in a resource allocation request (step S205). When it is decided that RM's are secured by the number of RM's to be secured (Yes in step S205), the push-out deployment unit 62 finishes the processing.

Meanwhile, when it is decided that RM's are not secured by the number of RM's to be secured (No in step S205), the push-out deployment unit 62 decides whether there is an RM whose average CPU utilization does not exceed a definition value after the move in the identical-type VMP group (step S206). In other words, the push-out deployment unit 62 decides whether, if a VM of a migration-source RM is moved to a migration-destination RM in the identical-type VMP group, there is a migration destination in which the average CPU utilization of the moved VM does not exceed the maximum definition value of VM average CPU utilization 64c. The maximum definition value of VM average CPU utilization 64c is stored in the VM state management table 64.

When it is decided that there is an RM that does not exceed the definition value in the identical-type VMP group (Yes in step S206), the push-out deployment unit 62 determines an RM of the lowest average CPU utilization as a push-out target in the identical-type VMP group (step S207). Subsequently, the push-out deployment unit 62 moves all VM's in the determined RM to an RM that does not exceed the definition value (step S208). As an example, the migration-destination RM is an RM which does not exceed the definition value and in which the average CPU utilization is larger than those of the RM's of the number of RM's to be secured, where the RM's are determined as a push-out target. After that, the push-out deployment unit 62 proceeds to step 5205 to secure the next RM.

Meanwhile, when it is decided that there is no RM that does not exceed the definition value in the identical-type VMP group (No in step S206), the push-out deployment unit 62 decides whether there is another type of VMP group of the second lowest average CPU utilization (step S209). When it is decided that there is another type of VMP group of the second lowest average CPU utilization (Yes in step S209), the push-out deployment unit 62 proceeds to step S205 to secure the next RM.

Meanwhile, when it is decided that there is no another type of VMP group of the second lowest average CPU utilization (No step S209), the push-out deployment unit 62 decides that available resources are insufficient, and finishes the processing without allocating resources.

Next, an example of an RM state output by the RM state output unit 63 will be explained with reference to FIG. 18. FIG. 18 is a view illustrating an output example of an RM state. As illustrated in FIG. 18, an arrangement name g1, an RM host name g2, an operation state g3, a correspondence system g4, an installed OS/version (VM allocation core count) g5 and an image file name g6 are output to the output unit 40. The arrangement name g1 corresponds to the arrangement name 12a of the RM management table 12. The RM host name g2 corresponds to the RM host name 12b of the RM management table 12. The operation state g3 corresponds to the operation state 12d of the RM management table 12. The correspondence system g4 corresponds to the correspondence system (version) 12f of the RM management table 12. The installed OS/version (VM allocation core count) g5 corresponds to the installed OS (version, VM allocation core count) 12g of the RM management table 12. The image file name g6 corresponds to the image file name 12i of the RM management table 12.

By the way, a case has been described where there is one server 1A including the RM management control unit 21 in the migration control system 9A according to the second embodiment. However, it is not limited to this in the migration control system 9A, and there may be a plurality of servers 1A including the RM management control unit 21. Therefore, the migration control system 9A in which there is a plurality of servers 1A including the RM management control unit 21, will be explained.

Figure 19:
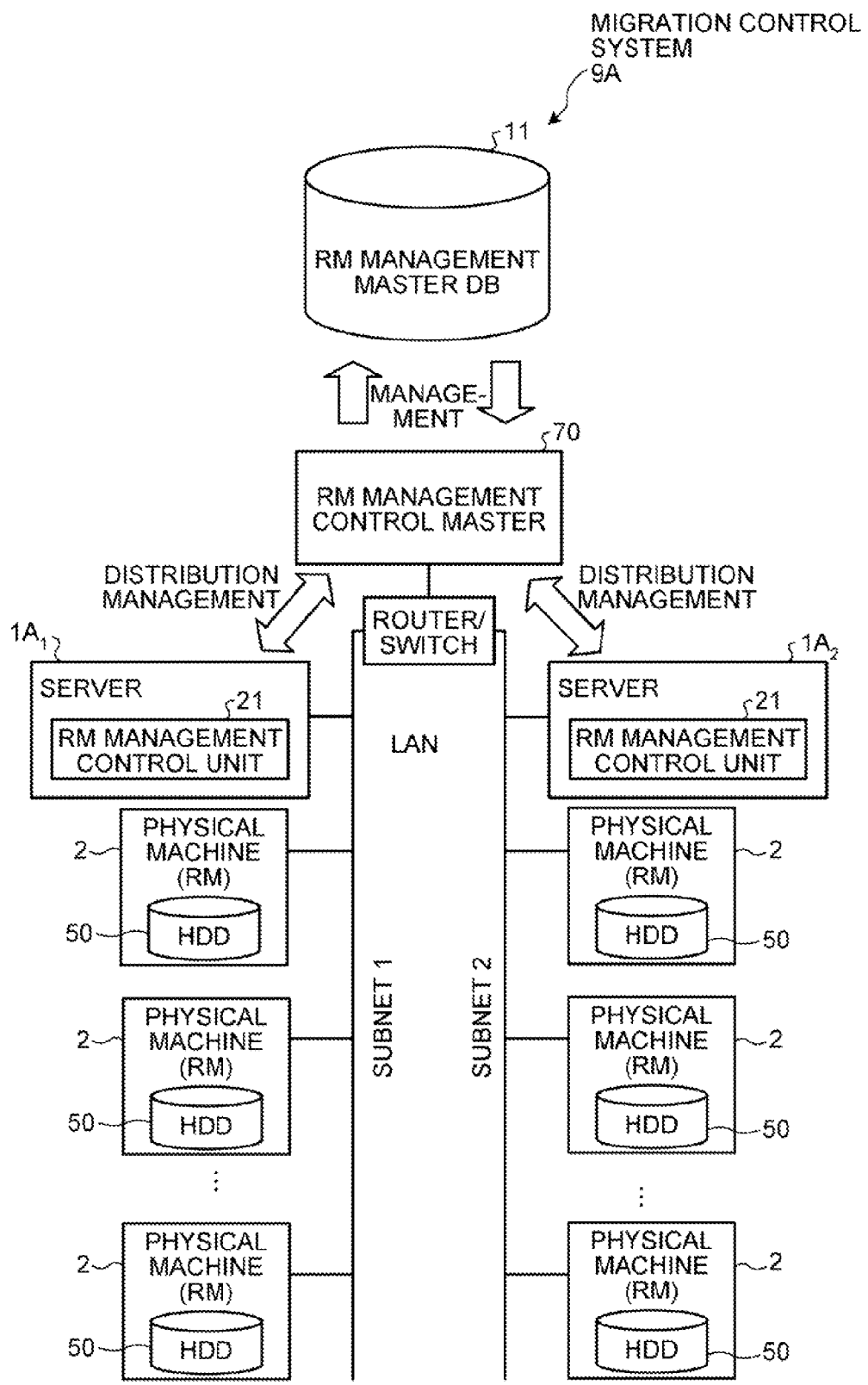
FIG. 19 is a view illustrating another configuration example of a migration control system according to the second embodiment.

FIG. 19 is a view illustrating another configuration example of the migration control system according to the second embodiment. As illustrated in FIG. 19, the migration control system 9A arranges a plurality of servers 1A including the RM management control unit 21 in subnets. Here, the migration control system 9A arranges a server $1A_1$ in a subnet 1 and a server $1A_2$ in a subnet 2. Subsequently, the RM management control unit 21 of the server $1A_1$ performs RM management control of the physical machines 2 in the subnet 1. The RM management control unit 21 of the server $1A_2$ performs RM management control of the physical machines 2 in the subnet 2. Subsequently, an RM management control master 70 separately manages processing in the RM management control unit 21 on the side of the subnet 1 and processing in the RM management control unit 21 on the side of the subnet 2, using the RM management master DB 11. By this means, even in a large-scale system, the migration control system 9A can manage the physical machines 2 deployed as RM's.

Advantage of Second Embodiment

According to the second embodiment, the push-out deployment unit 62 determines the migration-source physical machine 2 based on the CPU utilization calculated every physical machine 2, among the physical machines 2 that are currently used as virtual machine environments. Subsequently, the push-out deployment unit 62 moves a VM storage image of the determined migration-source physical machine 2 to another physical machine 2 that is currently used as a virtual machine environment. Subsequently, after a completion of the move, the push-out deployment unit 62 moves a storage image of a VMP that controls a VM of the migration-source physical machine 2, to the RM management master DB 11. Further, the push-out deployment unit 62 acquires a storage image of a physical machine environment, which includes an OS, and writes the acquired image in the migration-source machine in which the move is completed. With such a configuration, the push-out deployment unit 62 sets the physical machine 2 that is currently used as a virtual machine environment, so as to be used as a physical machine environment, and therefore it is possible to speed up batch processing in a case where the batch processing is performed. Also, the push-out deployment unit 62 moves a VM of the currently used physical machine 2 to another physical machine 2, and therefore it is possible to continuously perform operations in the moved VM without stopping.

Also, according to above the second embodiment, the push-out deployment unit 62 determines the physical machine 2 of the lowest CPU utilization among the physical machines 2 that are currently used as virtual machine environments, as the migration-source physical machine 2. With such configuration, the push-out deployment unit 62 determines the physical machine 2 of the lowest CPU utilization as the migration-source physical machine 2, and therefore it is possible to move a VM of the migration source to a migration destination at high speed and deploy the migration-source physical machine 2 as a physical machine environment at an early time. As a result of this, in a case of performing batch processing, the push-out deployment unit 62 can perform the batch processing at high speed under the deployed physical machine environment.

Also, according to the second embodiment, in the server 1A, the batch job control unit 61 outputs a resource release request to the RM management control unit 21 based on a remaining condition of batch jobs accumulated in the queue, so as to deploy a physical-machine-environment RM as a calculation server for the batch jobs. However, it is not limited to this in the server 1A, and the resource allocation request may be output from the web browser to the RM management control unit 21 so as to deploy a physical-machine-environment RM as a calculation server for batch jobs.

Program and so on

Also, the servers 1 and 1A can be realized by mounting each function such as the above mentioned control unit 20 and the storage unit 10 on an information processing device such as a known personal computer and workstation.

Also, each illustrated component of each device is not always requested to be physically configured as illustrated in the drawings. That is, the specific aspect of distribution/integration in each device is not limited to what is illustrated in the drawings. That is, depending on various loads or a use status, it is possible to form them by functionally or physically distributing or integrating all or part of them in an arbitrary unit. For example, it is possible to integrate the RM image backup unit 22 and the RM stop unit 25 as one unit. Meanwhile, the push-out deployment unit 62 may be distributed into a determination unit that determines a push-out target RM, a first switching unit that switches the RM determined by the determination unit to a physical machine environment, and a second switching unit that restores it to the original virtual machine environment. Also, the storage unit 10 such as the RM management master DB 11 may be connected via the network 3 as an external device of the servers 1 and 1A.

Figure 20:
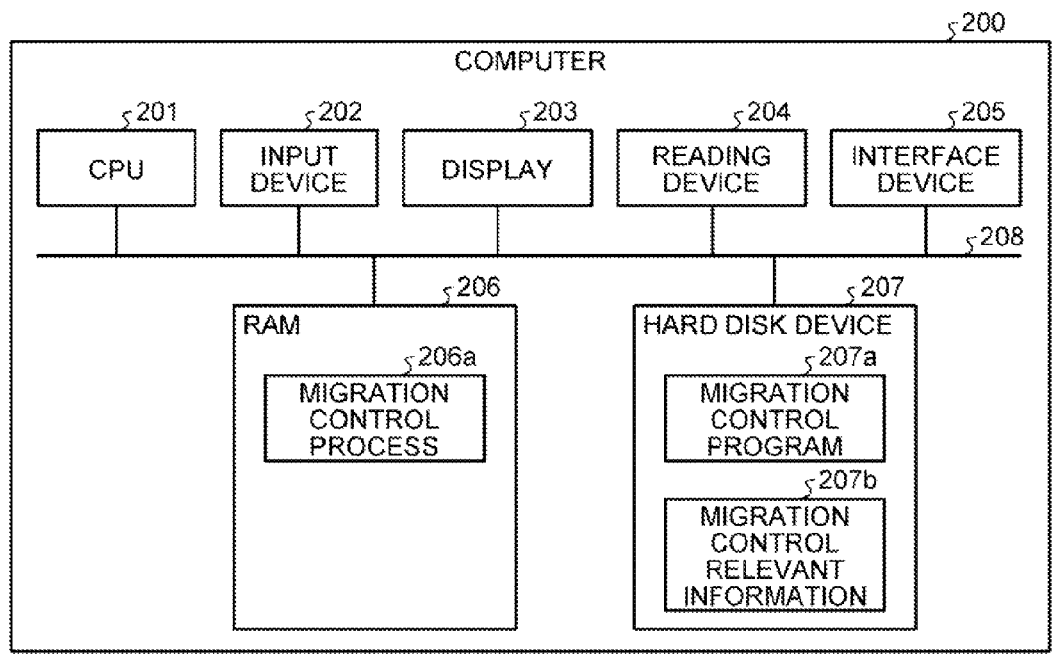
FIG. 20 is a view illustrating an example of a computer that executes a migration control program.

Also, various kinds of processing explained in the above embodiments can be realized by causing a computer such as a personal computer and workstation to execute a prepared program. Therefore, in the following, an example of a computer that executes a migration control program to realize the same functions as in the server 1 illustrated in FIG. 1, will be explained. FIG. 20 is a view illustrating an example of a computer that executes a migration control program.

As illustrated in FIG. 20, a computer 200 includes a CPU 201 that performs various kinds of computation processing, an input device 202 that accepts an input of data from the user, and a display 203. Further, the computer 200 includes a reading device 204 that reads a program from a storage medium, and an interface device 205 that transmits/receives data with another computer via the network 3. Further, the computer 200 includes an RAM 206 that temporarily stores various kinds of information and a hard disk device 207. Here, these devices 201 to 207 are connected to a bus 208.

The hard disk device 207 stores a migration control program 207a and migration control relevance information 207b. The CPU 201 reads the migration control program 207a and develops it in the RAM 206. The migration control program 207a functions as migration control process 206a.

For example, the migration control process 206a corresponds to the RM image backup unit 22, the RM image writing unit 23, the RM startup unit 24 and the RM stop unit 25. The migration control relevance information 207b corresponds to the RM management master DB 11.

Also, the migration control program 207a is not necessarily stored in the hard disk device 207 from the beginning. For example, the program is stored in a computer-readable recording medium such as a flexible disk (FD), a CD-ROM, a DVD disk, a magnetic optical disk and an IC card, which is inserted in the computer 200. Subsequently, the computer 200 may read the migration control program 207a from the computer-readable recording medium and execute it.

According to an aspect of the embodiments disclosed in the present application, there is an advantage that it is possible to perform batch processing at high speed even in a machine of a virtual machine environment.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a migration control program that causes a computer to perform a process comprising:

first live migrating all virtual machines running on a first virtual machine platform of a first physical machine to a second virtual machine platform of a second physical machine, wherein the first and second virtual machine platforms are of the same type;

moving the first virtual machine platform to a database;

writing a storage image including an operating system of a physical machine environment to the first physical machine;

restarting the first physical machine;

executing, by the first physical machine, batch jobs remaining in a queue;

moving the storage image to the database;

writing the first virtual machine platform to the first physical machine;

second live migrating the first live migrated virtual machines from the second virtual machine platform back to the first virtual machine platform.

2. The non-transitory computer-readable recording medium according to claim 1, wherein the first and second physical machines are among a plurality of physical machines and prior to the first migrating:

determining the physical machine with the lowest Central Processing Unit (CPU) utilization among the plurality of physical machines; and first live migrating all of the virtual machines from the determined physical machine.

3. The non-transitory computer-readable recording medium according to claim 2, wherein the CPU utilization of each physical machine is the average of the CPU utilization of the virtual machines running on the virtual machine platform of the respective physical machine.

4. A migration control method comprising:

first live migrating all virtual machines running on a first virtual machine platform of a first physical machine to a second virtual machine platform of a second physical machine, wherein the first and second virtual machine platforms are of the same type;

moving the first virtual machine platform to a database;

writing a storage image including an operating system of a physical machine environment to the first physical machine;

restarting the first physical machine;

executing, by the first physical machine, batch jobs remaining in a queue;

moving the storage image to the database;

writing the first virtual machine platform to the first physical machine;

second live migrating the first live migrated virtual machines from the second virtual machine platform back to the first virtual machine platform.

5. The method of claim 4, wherein the first and second physical machines are among a plurality of physical machines and prior to the first migrating:

determining the physical machine with the lowest Central Processing Unit (CPU) utilization among the plurality of physical machines; and first live migrating all of the virtual machines from the determined physical machine.

6. The method of claim 5, wherein the CPU utilization of each physical machine is the average of the CPU utilization of the virtual machines running on the virtual machine platform of the respective physical machine.

7. A control device comprising:

a memory; and a processor to perform the steps of:

first live migrating all virtual machines running on a first virtual machine platform of a first physical machine to a second virtual machine platform of a second physical machine, wherein the first and second virtual machine platforms are of the same type;

moving the first virtual machine platform to a database;

writing a storage image including an operating system of a physical machine environment to the first physical machine;

restarting the first physical machine;

executing, by the first physical machine, batch jobs remaining in a queue;

moving the storage image to the database;

writing the first virtual machine platform to the first physical machine;

second live migrating the first live migrated virtual machines from the second virtual machine platform back to the first virtual machine platform.

8. The control device of claim 7, wherein the first and second physical machines are among a plurality of physical machines and prior to the first migrating the processor performs the steps of:

determining the physical machine with the lowest Central Processing Unit (CPU) utilization among the plurality of physical machines; and first live migrating all of the virtual machines from the determined physical machine.

9. The control device of claim 8, wherein the CPU utilization of each physical machine is the average of the CPU utilization of the virtual machines running on the virtual machine platform of the respective physical machine.

* * * * *